(12) United States Patent
Wheatley et al.

(10) Patent No.: US 9,229,149 B2
(45) Date of Patent: *Jan. 5, 2016

(54) OPTICAL CONSTRUCTIONS INCORPORATING A LIGHT GUIDE AND LOW REFRACTIVE INDEX FILMS

(71) Applicant: 3M INNOVATIVE PROPERTIES COMPANY, St. Paul, MN (US)

(72) Inventors: John A. Wheatley, Lake Elmo, MN (US); Tao Liu, Woodbury, MN (US); Encai Hao, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/557,231

(22) Filed: Dec. 1, 2014

(65) Prior Publication Data

US 2015/0131311 A1    May 14, 2015

Related U.S. Application Data

(63) Continuation of application No. 13/511,381, filed as application No. PCT/US2010/058526 on Dec. 1, 2010, now Pat. No. 8,950,924.

(60) Provisional application No. 61/267,631, filed on Dec. 8, 2009.

(51) Int. Cl.
*F21V 8/00*    (2006.01)

(52) U.S. Cl.
CPC ............. *G02B 6/0035* (2013.01); *G02B 6/005* (2013.01); *G02B 6/0053* (2013.01); *G02B 6/008* (2013.01);

(Continued)

(58) Field of Classification Search
CPC .. G02B 6/0043; G02B 6/0051; G02B 6/0056; G02B 6/008; G02B 6/005; G02B 6/0053; G02B 6/0035; G02B 2207/107
See application file for complete search history.

(56) References Cited

U.S. PATENT DOCUMENTS 2,976,576 A    3/1961    Wichterle
3,610,729 A    10/1971    Rogers (Continued)

FOREIGN PATENT DOCUMENTS

DE    10-2007-063471    12/2008
EP    1002830    5/2000

(Continued)

OTHER PUBLICATIONS

ASTM Designation: D 1003-00, "Standard Test Method for Haze and Luminous Transmittance of Transparent Plastics", 2000, pp. 198-203.

(Continued)

*Primary Examiner* — Mary Ellen Bowman
(74) *Attorney, Agent, or Firm* — Daniel J. Iden

(57) ABSTRACT

Optical constructions use a low index of refraction layer disposed between a low absorption layer and a high absorption layer to increase confinement of light to the low absorption region of the optical constructions. Low index layers can be used in optical constructions that have multi-tiered light confinement. In these constructions, a first tier of reflection is provided when light is reflected at the surface of a low index optical film which is disposed directly or indirectly on a light guide. A second tier of reflection occurs at the surface of a light redirecting film having appropriately oriented refractive structures.

22 Claims, 24 Drawing Sheets

(52) U.S. Cl.
CPC .............. *G02B 6/0043* (2013.01); *G02B 6/0051* (2013.01); *G02B 6/0056* (2013.01); *G02B 2207/107* (2013.01)

(56) References Cited

U.S. PATENT DOCUMENTS

| | | | |
|---|---|---|---|
| 3,691,140 A | 9/1972 | Silver |
| 4,166,152 A | 8/1979 | Baker |
| 4,212,048 A | 7/1980 | Castleberry |
| 4,446,305 A | 5/1984 | Rogers |
| 4,539,256 A | 9/1985 | Shipman |
| 4,726,989 A | 2/1988 | Mrozinski |
| 4,906,070 A | 3/1990 | Cobb, Jr. |
| 4,968,562 A | 11/1990 | Delgado |
| 4,994,322 A | 2/1991 | Delgado |
| 5,056,892 A | 10/1991 | Cobb, Jr. |
| 5,120,594 A | 6/1992 | Mrozinski |
| 5,238,623 A | 8/1993 | Mrozinski |
| 5,296,277 A | 3/1994 | Wilson |
| 5,362,516 A | 11/1994 | Wilson |
| 5,486,949 A | 1/1996 | Schrenk |
| 5,528,720 A | 6/1996 | Winston |
| 5,691,846 A | 11/1997 | Benson, Jr. |
| 5,711,589 A | 1/1998 | Oe |
| 5,808,709 A | 9/1998 | Davis |
| 5,808,713 A | 9/1998 | Broer |
| 5,845,035 A | 12/1998 | Wimberger-Friedl |
| 5,882,774 A | 3/1999 | Jonza |
| 5,919,555 A | 7/1999 | Yasuda |
| 5,992,066 A | 11/1999 | Brauer |
| 5,993,954 A | 11/1999 | Radovanovic |
| 6,090,861 A | 7/2000 | Mendenhall et al. |
| 6,157,490 A | 12/2000 | Wheatley |
| 6,166,855 A | 12/2000 | Ikeyama |
| 6,197,397 B1 | 3/2001 | Sher |
| 6,204,202 B1 | 3/2001 | Leung |
| 6,208,466 B1 | 3/2001 | Liu |
| 6,210,858 B1 | 4/2001 | Yasuda |
| 6,224,223 B1 | 5/2001 | Higuchi |
| 6,280,063 B1 | 8/2001 | Fong |
| 6,352,761 B1 | 3/2002 | Hebrink |
| 6,355,759 B1 | 3/2002 | Sherman |
| 6,368,699 B1 | 4/2002 | Gilbert |
| 6,457,823 B1 | 10/2002 | Cleary |
| 6,461,724 B1 | 10/2002 | Radovanovic |
| 6,559,909 B1 | 5/2003 | Kushida |
| 6,573,305 B1 | 6/2003 | Thunhorst |
| 6,688,751 B2 | 2/2004 | Lee |
| 6,703,463 B2 | 3/2004 | Holguin |
| 6,719,426 B2 | 4/2004 | Magarill |
| 6,783,349 B2 | 8/2004 | Neavin |
| 6,846,089 B2 | 1/2005 | Stevenson |
| 6,890,642 B2 | 5/2005 | Kaminsky |
| 6,924,014 B2 | 8/2005 | Ouderkirk |
| 6,927,911 B2 | 8/2005 | Tsai |
| 6,958,860 B2 | 10/2005 | Dontula |
| 6,987,612 B2 | 1/2006 | Allen |
| 6,996,296 B2 | 2/2006 | Bastiaansen |
| 6,999,233 B2 | 2/2006 | Allen |
| 7,027,671 B2 | 4/2006 | Huck |
| 7,068,910 B2 | 6/2006 | Duine |
| 7,072,544 B2 | 7/2006 | Cornelissen |
| 7,132,136 B2 | 11/2006 | Laney |
| 7,157,839 B2 | 1/2007 | Ouderkirk |
| 7,185,993 B2 | 3/2007 | Smith |
| 7,204,616 B2 | 4/2007 | Kitamura |
| 7,309,135 B2 | 12/2007 | Smith |
| 7,315,671 B2 | 1/2008 | Huck |
| 7,327,415 B2 | 2/2008 | Brickey |
| 7,372,075 B2 | 5/2008 | Shigemura |
| 7,379,130 B1 | 5/2008 | Bhalla |
| 7,466,373 B2 | 12/2008 | Xu |
| 7,517,129 B2 | 4/2009 | Choi |
| 7,526,164 B2 | 4/2009 | Ouderkirk |
| 7,599,592 B2 | 10/2009 | Benson, Jr. |
| 8,008,362 B2 | 8/2011 | Schadler |
| 8,016,445 B2 | 9/2011 | Sugita et al. |
| 2003/0118750 A1 | 6/2003 | Bourdelais |
| 2003/0118807 A1 | 6/2003 | Laney |
| 2003/0170442 A1 | 9/2003 | Kaminsky |
| 2004/0056994 A1 | 3/2004 | Honda |
| 2004/0164325 A1 | 8/2004 | Siegel |
| 2004/0233657 A1 | 11/2004 | Lin |
| 2006/0019114 A1 | 1/2006 | Thies |
| 2006/0056166 A1 | 3/2006 | Yeo |
| 2006/0082699 A1 | 4/2006 | Gehlsen |
| 2006/0082700 A1 | 4/2006 | Gehlsen |
| 2006/0215079 A1 | 9/2006 | Suzuki |
| 2006/0245718 A1 | 11/2006 | Winston |
| 2006/0246233 A1 | 11/2006 | Fukuda |
| 2006/0275595 A1 | 12/2006 | Thies |
| 2007/0000606 A1 | 1/2007 | Steelman |
| 2007/0018308 A1 | 1/2007 | Schott |
| 2007/0020404 A1 | 1/2007 | Seiberle |
| 2007/0047259 A1 | 3/2007 | Lee |
| 2007/0052882 A1 | 3/2007 | Hwang |
| 2007/0065638 A1 | 3/2007 | Wang |
| 2007/0189038 A1 | 8/2007 | Pokorny |
| 2007/0286993 A1 | 12/2007 | Radcliffe |
| 2008/0037127 A1 | 2/2008 | Weber |
| 2008/0043490 A1 | 2/2008 | Coleman |
| 2008/0064133 A1 | 3/2008 | Lee |
| 2008/0151375 A1 | 6/2008 | Lin |
| 2008/0186738 A1 | 8/2008 | Kim |
| 2008/0192352 A1 | 8/2008 | Laney |
| 2008/0198293 A1 | 8/2008 | Boonekamp |
| 2008/0214075 A1 | 9/2008 | Marte |
| 2008/0220554 A1 | 9/2008 | Shigemura |
| 2008/0248312 A1 | 10/2008 | Thies |
| 2008/0252823 A1 | 10/2008 | Hwang |
| 2008/0291696 A1 | 11/2008 | Kim |
| 2008/0300339 A1 | 12/2008 | Wright |
| 2008/0305282 A1 | 12/2008 | Inakura |
| 2009/0005468 A1 | 1/2009 | Schadler |
| 2009/0029145 A1 | 1/2009 | Thies |
| 2010/0156953 A1 | 6/2010 | Nevitt |
| 2010/0208349 A1 | 8/2010 | Beer |
| 2010/0238686 A1 | 9/2010 | Weber |
| 2010/0265584 A1 | 10/2010 | Coggio |
| 2011/0102891 A1 | 5/2011 | Derks |
| 2011/0222263 A1 | 9/2011 | Weber |
| 2011/0222295 A1 | 9/2011 | Weber |
| 2011/0228511 A1 | 9/2011 | Weber |
| 2011/0279997 A1 | 11/2011 | Weber |
| 2012/0021134 A1 | 1/2012 | Kolb |
| 2012/0026431 A1 | 2/2012 | Coggio |
| 2012/0027945 A1 | 2/2012 | Kolb |
| 2012/0038850 A1 | 2/2012 | Hao |
| 2012/0038990 A1 | 2/2012 | Hao |
| 2012/0039089 A1 | 2/2012 | Hao |

FOREIGN PATENT DOCUMENTS

| | | |
|---|---|---|
| EP | 1022587 | 7/2000 |
| EP | 1256834 | 11/2002 |
| EP | 1450202 | 8/2004 |
| EP | 1479734 | 11/2004 |
| EP | 1855150 | 11/2007 |
| FR | 2908523 | 5/2008 |
| GB | 1188736 | 3/1968 |
| JP | 2005-266343 | 3/2004 |
| JP | 2004-235103 | 8/2004 |
| JP | 2005-134441 A | 5/2005 |
| JP | 2008-003243 | 1/2008 |
| JP | 2008-241889 A | 10/2008 |
| KR | 2002-0003667 | 1/2002 |
| WO | WO 00-56556 | 9/2000 |
| WO | WO 01-04954 | 1/2001 |
| WO | WO 2006-054197 | 5/2006 |
| WO | WO 2006-096258 | 9/2006 |
| WO | WO 2006-120638 | 11/2006 |
| WO | WO 2006-124588 | 11/2006 |
| WO | WO 2007-065847 | 6/2007 |
| WO | WO 2008-011919 | 1/2008 |

(56) References Cited

FOREIGN PATENT DOCUMENTS

| WO | WO 2008002772 A1 | 1/2008 |
|---|---|---|
| WO | WO 2008-098872 | 8/2008 |
| WO | WO 2008-144136 | 11/2008 |
| WO | WO 2008-144644 | 11/2008 |
| WO | WO 2008-144656 | 11/2008 |
| WO | WO 2009-006252 | 1/2009 |
| WO | WO 2009-123928 | 10/2009 |
| WO | WO 2010-120845 | 10/2010 |
| WO | WO 2010-120864 | 10/2010 |
| WO | WO 2010-120971 | 10/2010 |
| WO | WO 2011-049751 | 4/2011 |
| WO | WO 2011-050226 | 4/2011 |
| WO | WO 2011-050228 | 4/2011 |
| WO | WO 2011-050232 | 4/2011 |
| WO | WO 2011-050236 | 4/2011 |
| WO | WO 2011-050254 | 4/2011 |
| WO | WO 2011-050268 | 4/2011 |
| WO | WO 2011-129848 | 10/2011 |
| WO | WO 2012-054318 | 4/2012 |

OTHER PUBLICATIONS

Azzam, "Reflection and Transmission of Polarized Light", Ellipsometry and Polarized Light, Published by North-Holland Publishing Company, 1977, pp. 340-352.

Berremen and Scheffer, "Bragg Reflection of Light From Single-Domain Cholesteric Liquid-Crystal Films", Physical Review letters, 1970, vol. 25, No. 9, pp. 577-581.

Cornelissen, Efficient and Cost-Effective Polarized-Light Backlights for LCDs, Proceedings of SPIE, vol. 7058, pp. 1-10, (2008).

Haze, Applications Note, Insight on Color, vol. 9, No. 6, 2008, pp. 1-4.

JAGT, "Polymeric Polarisation Optics for Energy Efficient LCD Illumination", PhD theses, 2001, pp. 1-226.

Ibn-Elhaj, Nature, "Optical Polymer Thin Films with Isotropic and Anisotropic Nano-Corrugated Surface Topologies", Letters to Nature, Apr. 12, 2001, vol. 410, pp. 796-799.

Oliveri, "Fabrication and Characterization of Polymeric Optical Waveguides Using Standard Silicon Processing Technology", Fibres and Optical Passive Components, Proceedings of 2005/IEEE/LEOS Workshop on Jun. 22-24, 2005, pp. 1-6.

Peng, "Enhanced Coupling of Light from Organic Light Emitting Diodes using Nanoporous Films", Journal of Applied Physics, Aug. 1, 2004, vol. 96, No. 3, pp. 1649-1654.

Risk, "Optical Waveguides with an Aqueous Core and a Low-Index Nanoporous Cladding", Optics Express, Dec. 27, 2004, vol. 12, No. 26, pp. 6446-6455.

Tsutsui, "Doubling Coupling-Out Efficiency in Organic Light-Emitting Devices Using a Thin Silica Aerogel Layer", Advanced Materials, Aug. 3, 2001, vol. 13, No. 15, pp. 1149-1152.

Walheim, "Nanophase-Seperated Polymer Films as High-Performance AntiReflection Coatings", Science, Jan. 22, 1999, vol. 283, pp. 520-522.

Yang, "Polarized light-guide plate for liquid crystal display", Optics Express, Oct. 17, 2005, vol. 13, No. 21, pp. 8349-8356.

Yu, "Comparison of Different Measurement Methods for Transmittance Haze", Metrologia, 2009, vol. 46, pp. 233-237. (XP002603289).

International Search Report for PCT/US2010/031010, mailed Aug. 17, 2010, 8 pages.

International Search Report for PCT/US2010/031149, mailed Jun. 22, 2010, 6 pages.

International Search Report for PCT/US2010/030984, mailed Oct. 14, 2010, 5 pages.

International Search Report for PCT/US2010/053719, mailed Feb. 15, 2011, 3 pages.

International Search Report for PCT/US2010/058526, mailed Feb. 25, 2011, 5 pages.

International Search Report for PCT/US2010/053751, mailed Mar. 18, 2011, 7 pages.

International Search Report for PCT/US2010/053673, mailed Jun. 30, 2011, 3 pages.

OPTICAL CONSTRUCTIONS INCORPORATING A LIGHT GUIDE AND LOW REFRACTIVE INDEX FILMS

CROSS-REFERENCE TO RELATED CASES

This application is a continuation of U.S. application Ser. No. 13/511,381 filed on May 23, 2012, which claims priority to PCT/US2010/058526, filed on Dec. 1, 2010, which claims the benefit of U.S. Provisional Application No. 61/267,631, filed on Dec. 8, 2009, the disclosures of which are incorporated by reference in their entirety herein.

RELATED APPLICATIONS

This application is related to the following U.S. Patent Applications which are incorporated herein in their entireties by reference: "Optical Film" filed on Apr. 15, 2009 and having Ser. No. 61/169,466; "Optical Construction and Display System Incorporating Same" filed on Apr. 15, 2009 and having Ser. No. 61/169,521; "Retroreflecting Optical Construction" filed on Apr. 15, 2009 and having Ser. No. 61/169,532; "Optical Film for Preventing Optical Coupling" filed on Apr. 15, 2009 and having Ser. No. 61/169,549; "Backlight and Display System Incorporating Same" filed on Apr. 15, 2009 and having Ser. No. 61/169,555; "Process and Apparatus for Coating with Reduced Defects" filed on Apr. 15, 2009 and having Ser. No. 61/169,427; "Process and Apparatus for A Nanovoided Article" filed on Apr. 15, 2009 and having Ser. No. 61/169,429; and "Optical Construction and Method of Making the Same" filed on Oct. 22, 2009 and having Ser. No. 61/254,243.

This application is further related to the following U.S. Patent Applications, all filed on Oct. 24, 2009 and which are incorporated in their entireties by reference: "Light Source and Display System Incorporating Same" having Ser. No. 61/254,672; "Gradient Low Index Article and Method" having Ser. No. 61/254,673; "Process for Gradient Nanovoided Article" having Ser. No. 61/254,674; "Immersed Reflective Polarizer with High Off-Axis Reflectivity" having Ser. No. 61/254,691; "Immersed Reflective Polarizer With Angular Confinement in Selected Planes of Incidence" having Ser. No. 61/254,692; and "Voided Diffuser" having Ser. No. 61/254,676.

FIELD OF THE INVENTION

This invention generally relates to optical constructions and to light sources and/or display systems that incorporate such optical constructions.

BACKGROUND

Optical displays, such as liquid crystal displays (LCDs), are becoming increasingly commonplace, finding use in many applications such as mobile telephones, hand-held computer devices ranging from personal digital assistants (PDAs) to electronic games, to larger devices such as laptop computers, LCD monitors and television screens. LCDs typically include one or more light management films to improve display performance, including output luminance, illumination uniformity, viewing angle, and overall system efficiency. Exemplary light management films include prismatically structured films, reflective polarizers, absorbing polarizers, and diffuser films.

Major trends in the display industry include reducing the cost of the light source, reducing the number of components in the light source, and making light sources thinner and more efficient.

SUMMARY

Some embodiments describe an optical construction that includes a low index layer having an index of refraction, Nuli, where Nuli is not greater than about 1.35. The optical construction also includes a high absorption layer and a light redirecting film. Substantial portions of each of two neighboring films in the optical construction are in physical contact with each other.

Some embodiments illustrate an optical construction including a light guide having first surface and a second surface comprising a major light exit surface of the light guide. The optical construction also includes light redirecting film. A low index layer is disposed between the light guide and the light redirecting film, the low index layer having an index of refraction not greater than 1.35. The low index layer may be attached to the second surface of the light guide and to the light redirecting film.

Another embodiment illustrates an optical construction including at least one light guide having an index of refraction N1 and a low index layer having an index of refraction, Nuli, where Nuli is less than N1. The optical construction includes a light redirecting film, wherein substantial portions of each of two neighboring films in the optical construction are in physical contact with each other.

Yet another embodiment illustrates an optical construction that includes a light guide, having first and second major surfaces and an index of refraction N1 and a low index layer having first and second major surfaces, the low index layer having an index of refraction, Nuli, where Nuli is less than N1, wherein a substantial portion of the first major surface of the low index layer is in physical contact with the second major surface of the light guide. The optical construction also includes a high absorption layer having a first major surface and a second major surface, wherein a substantial portion of the first major surface of the high absorption layer is in physical contact with the second major surface of the low index layer. The optical construction further includes a prism film, having a first major surface and a second major surface, wherein the first major surface comprising linear prisms and a substantial portion of the first major surface of the light re-directing film is in physical contact with the second major surface of the high absorption layer. The low index layer reflects light exiting from the light guide at a first set of exit angles and the light re-directing film is configured to reflect light exiting from the light guide at a second set of exit angles.

BRIEF DESCRIPTION OF DRAWINGS

Various embodiments of the invention may be more completely understood and appreciated in consideration of the following detailed description of various embodiments of the invention in connection with the accompanying drawings, in which:

FIG. 10A is a schematic side view of the optical construction tested in Example 2a;

DETAILED DESCRIPTION

Figure 1A:
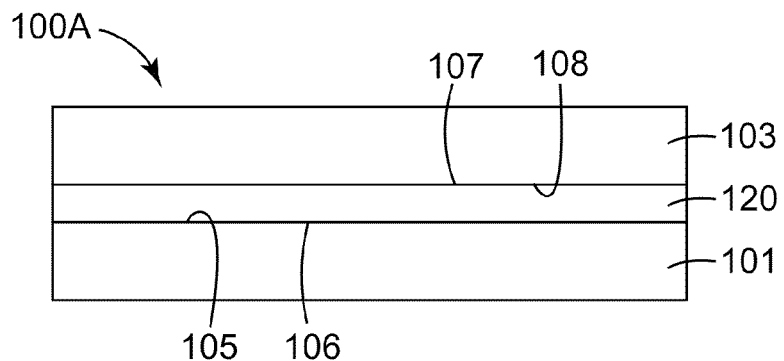
FIGS. 1A-1J are schematic side views of optical constructions incorporating low index refractive layers in accordance with embodiments of the invention.

Various embodiments of the invention are directed to optical constructions that include a low index of refraction optical film which has the ability to support total internal reflection at the exit surface of a low absorption optical layer such as a light guide. The low index optical film may be disposed between a light guide and a light redirecting film to provide two tiers of internal reflection. The low index optical film may be disposed between a low absorption layer and a high absorption layer, increasing the optical confinement of the light within the low absorption layer.

Incorporation of the disclosed optical constructions into various optical or display systems, for example, a liquid crystal display system, may improve system durability, reduce manufacturing cost, increase the efficiency, and/or reduce the overall thickness of the system. The optical constructions discussed herein may be used in displays, hand held applications, such as cell phones and personal data assistants (PDAs), notebook and desktop computer monitors, signs, luminaires, projection systems, and/or other applications.

Embodiments described herein illustrate the use of one or more optical films having a low index of refraction to reduce exposure of light to high absorption materials and/or to reduce premature light extraction using multiple tiers of reflection.

In some configurations, the low index film is disposed between a high absorption layer and a low absorption layer, e.g., a light guide, to increase confinement of light within the low absorption material and reduce exposure of most of the light to the higher absorption layer. During light transport from the edge of the light guide, the light is primarily exposed to the low absorption material of the light guide and exposure to the high absorption material does not occur until the light is extracted over a short path length at an angle close to normal to the surface. Increasing the confinement of light to low absorption materials reduces the exposure of light to high absorption materials, thereby improving system efficiency.

In some configurations, a film having a low index of refraction is disposed on a major exit surface of a light guide to provide a first tier of total internal reflection (TIR) within the light guide. In these configurations, some of the light in the light guide may nevertheless escape (leak) from the light guide before extraction, e.g., extraction by the light guide extraction features. The degree of light leakage is dependent on the difference between the refractive index of the light guide and the refractive index of the low index film. A higher index guide collimates (by refraction) edge injected light more than a lower index guide due to Snell's law. If light is insufficiently collimated, it will not be within the TIR confinement range, and will leak out the major surface of the guide.

Some optical constructions described herein illustrate a multi-tiered TIR approach that enhances the amount of light contained within the optical construction until it is extracted by the light guide extraction features. As discussed in more detail below, a first tier of TIR is provided when light is reflected at the surface of a low index optical film which is disposed directly or indirectly on a light guide. A second tier of TIR occurs at the surface of a light redirecting film having appropriately oriented refractive structures. Additional tiers of TIR are also possible by incorporating additional layers.

FIG. 1A illustrates a cross section diagram of an optical construction 100A in accordance with embodiments of the invention. Optical construction 100A includes a low absorption layer 101 having absorption A1 and an index of refraction N1. The low absorption layer 101 may comprise a light guide, for example. The optical construction 100A includes a high absorption layer 103. High absorption layer 103, which may comprise a polarizer, a structured film, and/or a light redirecting film, for example, has absorption A3 and index of refraction N3. The absorption of high absorption layer 103 is greater than the absorption of low absorption layer 101. In some embodiments, the absorption of the high absorption layer 103 is about twice the absorption of the low absorption layer 101. The high absorption layer 103 may include weathering absorbers for blue or UV, absorbing polarizers, reflective polarizers, phosphors, microreplication resins for structured surfaces, multilayer films, and/or other layers. Particularly for signs and graphics applications the high absorption layer may include printing inks and paints which contain dyes, pigments, and scattering materials such as titanium indium oxide (TIO2).

Disposed between the low absorption layer 101 and high absorption layer 103 is low index optical film 120. Low index optical film 120 has absorption A2 and an index of refraction N2, where N2<N1. In some embodiments, N2 is between about 1.10 and N1. In some embodiments, N2 is less than about 1.35. Substantial portions of two neighboring major surfaces in optical construction 100A are in physical contact with each other. For example, substantial portions of neighboring major surfaces 105 and 106 of respective neighboring layers 101 and 120 are in physical contact with each other. Additionally or alternatively, substantial portions of neighboring major surfaces 107 and 108 of respective neighboring layers 120 and 103 are in physical contact with each other. The phrases "substantial portions in physical contact" or "substantial physical contact" means that at least 50%, or at least 60%, or at least 70%, or at least 80%, or at least 90%, or at least 95% of the neighboring major surfaces are in physical contact with each other.

In some cases, low index optical film 120 is formed or coated directly on the low absorption layer 101. In some cases, optical film 120 is formed or coated directly on the high absorption layer 103. In some cases, one or more layers, e.g., an adhesive layer, may be disposed between the low absorption layer 101 and the optical film 120, and/or between the high absorption layer 103 and the optical film 120. In these constructions, substantial portions of two neighboring major surfaces in the optical construction are in physical contact with each other. For example, in an optical construction having an adhesive layer disposed between light guide 101 and low index optical film 120, substantial physical contact occurs between a first major surface of the adhesive layer and surface 105 of the light guide 101 and/or substantial physical contact occurs between a second major surface of the adhesive layer and surface 106 of the low index optical film 120. In some cases a diffuser layer can be disposed between low index layer 120 and high absorption layer 103. Diffuser layer can be any type of diffuser including scattering particles in a matrix, or a diffuser layer comprising a plurality of voids such as described in patent application titled "Optical Film" filed on Apr. 15, 2009 and having Ser. No. 61/169,466.

Figure 1B:
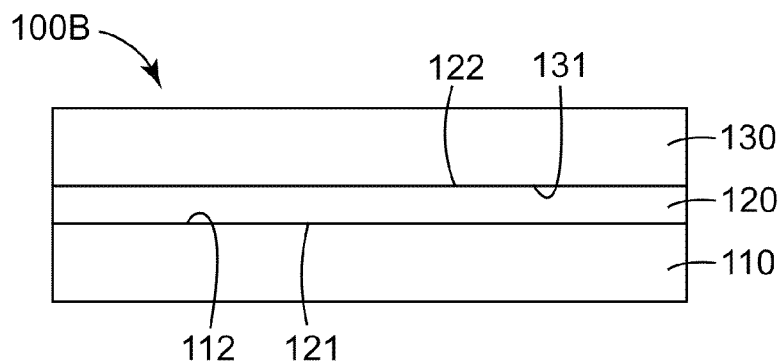

FIG. 1B illustrates a cross sectional diagram of an optical construction 100B in accordance with embodiments of the invention. The optical construction 100B includes a light guide 110 and a low index optical film 120 disposed on the light guide 110. A light redirecting film 130 is disposed on the low index optical film 120. The light guide 110 has an index of refraction of N1 and the low index optical film 120 has an index of refraction of N2, wherein N2<N1, or N2 is less than 1.35, or less than 1.30, or less than 1.25, or less than 1.20, or less than 1.15 or is between about 1.10 and N1, for example. Substantial portions of two neighboring major surfaces in optical construction 100B are in physical contact with each other. For example, in one implementation, substantial portions of neighboring major surfaces 112 and 121 of respective neighboring layers 110 and 120 are in physical contact with each other and/or substantial portions of neighboring major surfaces 122 and 131 of respective neighboring layers 120 and 130 are in physical contact with each other.

In some cases, low index optical film 120 is formed or coated directly on light guide 110. In some cases, low index optical film 120 is formed or coated directly on light redirecting film 130. In some cases, light redirecting film 130 has an absorption that is greater than the absorption of light guide 110 and an index of refraction between about 1.5 and 1.8, for example.

Figure 1C:
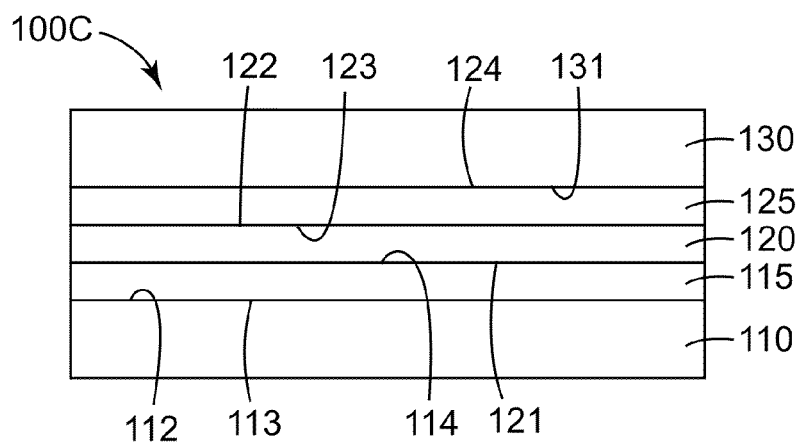

In some implementations, there may be one or more additional layers disposed between the light guide 110 and the low index optical film 120 as shown by the cross sectional diagram of an optical construction 100C in FIG. 1C. In this example, low index optical film 120 is attached to the light guide 110 by adhesive layer 115. Low index optical film 120 is attached to the light redirecting film 130 by adhesive layer 125. Substantial portions of neighboring major surfaces the neighboring layers in optical construction 100C are in physical contact with each other.

In optical construction 100C, major surface 112 of light guide 110 is in substantial physical contact with major surface 113 of adhesive layer 115, major surface 114 of adhesive layer 115 is in substantial physical contact with major surface 121 of low index film 120, surface 122 of low index film 120 is in substantial physical contact with surface 123 of adhesive layer 125, surface 124 of adhesive layer 125 is in substantial physical contact with surface 131 of light redirecting film 130.

Figure 1D:
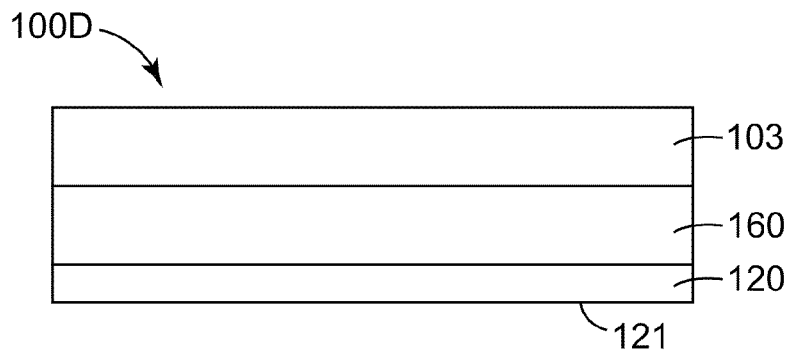

FIG. 1D illustrates an optical construction 100D that includes one or more high absorption layers 160 disposed between low index optical film 120 and light redirecting film 130. The high absorption layer 160 may comprise, for example, an absorbing polarizer, a reflective polarizer, weathering absorbers for blue or UV light, phosphors, layers comprising microreplication resins having structured surfaces. The high absorption layer 160 may also include printing inks and paints which contain dyes, pigments, and scattering materials such as TIO2. These types of absorbing layers are of particular importance in signs and graphics applications. Optical construction 100C may include an adhesive layer with a removable backing layer (not shown) that is adhered to the surface 121 of the low index layer 120, providing a light management stack ready to be adhesively attached to a light guide after removing the adhesive backing. In some cases, low index optical film 120 may be formed on the high absorption layer 160 and in some cases, the low index optical film 120 may be adhesively attached to the high absorption layer 160.

Figure 1E:
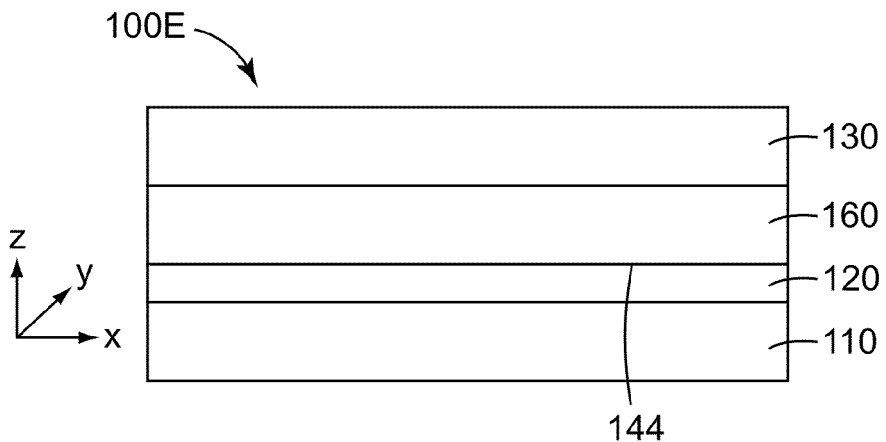

FIG. 1E shows an optical construction 100E which includes the optical construction 100D illustrated in FIG. 1D disposed on a light guide 110. The light guide 110 has absorption A1 and the high absorption layer 160 has absorption A3, where A1 is less than A3. In some cases A3 is about twice A1.

If a reflective polarizer is used as the high absorption layer 160, reflective polarizer 160 substantially reflects light that has a first polarization state and substantially transmits light that has a second polarization state, where the two polarization states are mutually orthogonal. For example, the average reflectance of reflective polarizer 160 in the visible for the polarization state that is substantially reflected by the reflective polarizer 160 is at least about 50%, or at least about 60%, or at least about 70%, or at least about 80%, or at least about 90%, or at least about 95%. As another example, the average transmittance of reflective polarizer 160 in the visible for the polarization state that is substantially transmitted by the reflective polarizer 160 is at least about 50%, or at least about 60%, or at least about 70%, or at least about 80%, or at least about 90%, or at least about 95%, or at least about 97%, or at least about 98%, or at least about 99%. In some cases, reflective polarizer 160 substantially reflects light having a first linear polarization state (for example, along the x-direction) and substantially transmits light having a second linear polarization state (for example, along the y-direction).

Any suitable type of reflective polarizer may be used for reflective polarizer layer 160 such as, for example, a multilayer optical film (MOF) reflective polarizer, a diffusely reflective polarizing film (DRPF) having a continuous phase and a disperse phase, such as a Vikuiti™ Diffuse Reflective Polarizer Film ("DRPF") available from 3M Company, St. Paul, Minn., a wire grid reflective polarizer described in, for example, U.S. Pat. No. 6,719,426, a fiber, blend, or cholesteric reflective polarizer.

In some cases, reflective polarizer 160 can be or include an MOF reflective polarizer, formed of alternating layers of different polymer materials, where one of the sets of alternating layers is formed of a birefringent material, where the refractive indices of the different materials are matched for light polarized in one linear polarization state and unmatched for light in the orthogonal linear polarization state. In such cases, an incident light in the matched polarization state is substantially transmitted through reflective polarizer 160 and an incident light in the unmatched polarization state is substantially reflected by reflective polarizer layer 160. The MOF may comprise a collimating or non collimating polarizer and may be an extended band polarizer. In some cases, an MOF reflective polarizer 160 can include a stack of inorganic dielectric layers.

As another example, reflective polarizer 160 can be or include a partially reflecting layer that has an intermediate on-axis average reflectance in the pass state. For example, the partially reflecting layer can have an on-axis average reflectance of at least about 90% for visible light polarized along the x-direction, and an on-axis average reflectance in a range from about 25% to about 90% for visible light polarized in a second plane along the y-direction. Such partially reflecting layers are described in, for example, U.S. Patent Publication No. 2008/064133, the disclosure of which is incorporated herein in its entirety by reference.

In some cases, reflective polarizer 160 can be or include a circular reflective polarizer, where light circularly polarized in one sense, which may be the clockwise or counterclockwise sense (also referred to as right or left circular polarization), is preferentially transmitted and light polarized in the opposite sense is preferentially reflected. One type of circular polarizer includes a cholesteric liquid crystal polarizer.

In some cases, reflective polarizer 160 can be a multilayer optical film that reflects or transmits light by optical interference, such as those described in Provisional U.S. Patent Application No. 61/116,132, filed Nov. 19, 2009; Provisional U.S. Patent Application No. 61/116,291, filed Nov. 19, 2008; Provisional U.S. Patent Application No. 61/116,294, filed Nov. 19, 2008; Provisional U.S. Patent Application No. 61/116,295, filed Nov. 19, 2008; and International Patent Application No. PCT/US 2008/064115, filed May 19, 2008, claiming priority from Provisional U.S. Patent Application No. 60/939,085, filed May 20, 2007; U.S. Provisional Patent Application No. 61/254,672 entitled "Light Source and Display System Incorporating Same,"; U.S. Provisional Patent Application No. 61/254,673 entitled "Gradient Low Index Article and Method,"; U.S. Provisional Patent Application No. 61/254,674 entitled "Process for Gradient Nanovoided Article,", filed Oct. 24, 2009; U.S. Provisional Patent Application No. 61/254,691 entitled "Immersed Reflective Polarizer with High Off-Axis Reflectivity,", filed Oct. 24, 2009; U.S. Provisional Patent application No. 61/254,692 entitled "Immersed Reflective Polarizer With Angular Confinement in Selected Planes of Incidence,", filed Oct. 24, 2009; and U.S. Provisional Application No. 61/254,676 entitled "Voided Diffuser,", filed Oct. 24, 2009, all incorporated herein by reference in their entireties.

Substantial portions of neighboring major surfaces in optical constructions 100D and 100E are in physical contact with each other. In some cases, low index optical film 120 is coated directly on the surface 144 of high absorption layer 160 or low index optical film 120 can be coated or formed on the light guide 110.

Figure 1F:
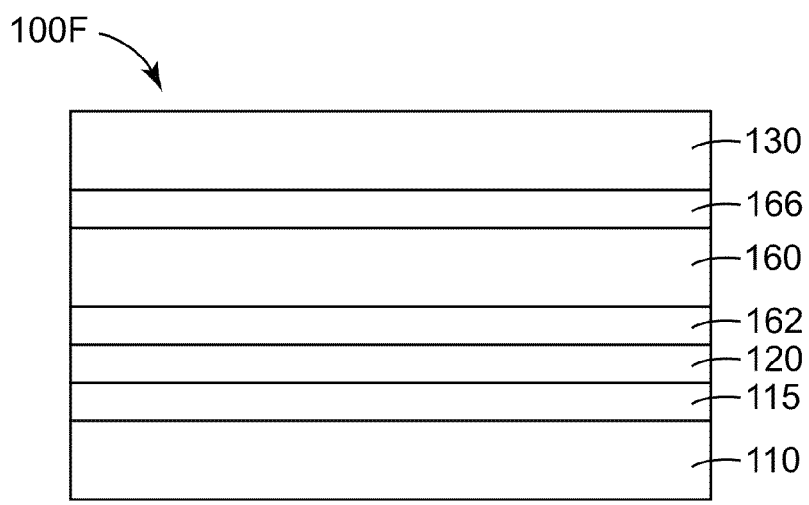

There may be one or more additional layers disposed in between high absorption layer 160 and low absorption optical film 120 and/or between the light guide 110 and the low absorption optical film 120 of construction 1E. For example, FIG. 1F is a schematic side-view of an optical construction 100F that includes an optical adhesive layer 162 disposed between optical film 120 and high absorption layer 160, e.g., a polarizer layer for adhering the optical film 120 to the polarizer layer 160. FIG. 1F also illustrates an optical adhesive 166 disposed between the light redirecting film 130 and the high absorption layer 160 and an optical adhesive 115 disposed between the light guide 110 and the low index optical film 120. Substantial portions of neighboring major surfaces of respective neighboring layers of optical construction 100F are in physical contact with each other. Not all the adhesive layers 115, 162, and 166 need to be used for an optical construction.

Optical adhesive layers 115, 162, 166 (FIG. 1F) and 125 (FIG. 1C) can include any optical adhesive that may be desirable and/or available in an application. Exemplary optical adhesives include pressure sensitive adhesives (PSAs), heat-sensitive adhesives, solvent-volatile adhesives, and UV-curable adhesives such as UV-curable optical adhesives available from Norland Products, Inc. Exemplary PSAs include those based on natural rubbers, synthetic rubbers, styrene block copolymers, (meth)acrylic block copolymers, polyvinyl ethers, polyolefins, and poly(meth)acrylates. As used herein, (meth)acrylic (or acrylate) refers to both acrylic and methacrylic species. Other exemplary PSAs include (meth)acrylates, rubbers, thermoplastic elastomers, silicones, urethanes, and combinations thereof. In some cases, the PSA is based on a (meth)acrylic PSA or at least one poly(meth)acrylate. Exemplary silicone PSAs include a polymer or gum and an optional tackifying resin. Other exemplary silicone PSAs include a polydiorganosiloxane polyoxamide and an optional tackifier. The adhesive may be or include a reusable and/or repositionable adhesive such as those described in, for example, U.S. Pat. No. 6,197,397; U.S. Patent Publication No. 2007/0000606; and PCT Publication No. WO 00/56556, the disclosures of which are incorporated herein in their entireties by reference. The phrases "reusable adhesive" or "repositionable adhesive" for adhering a film to a substrate mean an adhesive that (a) affords a temporary, secure attachment of the film to the substrate while affording convenient, manual removal of the film from the substrate without damaging the substrate or exhibiting excessive adhesive transfer from the film to the substrate, and (b) then affords subsequent reuse of the film on, for example, another substrate. For example, if adhesive 115 is a repositionable adhesive, then the low index film 120 is repositionable because low index film 120 can be repositioned on the light guide 110.

Figure 1G:
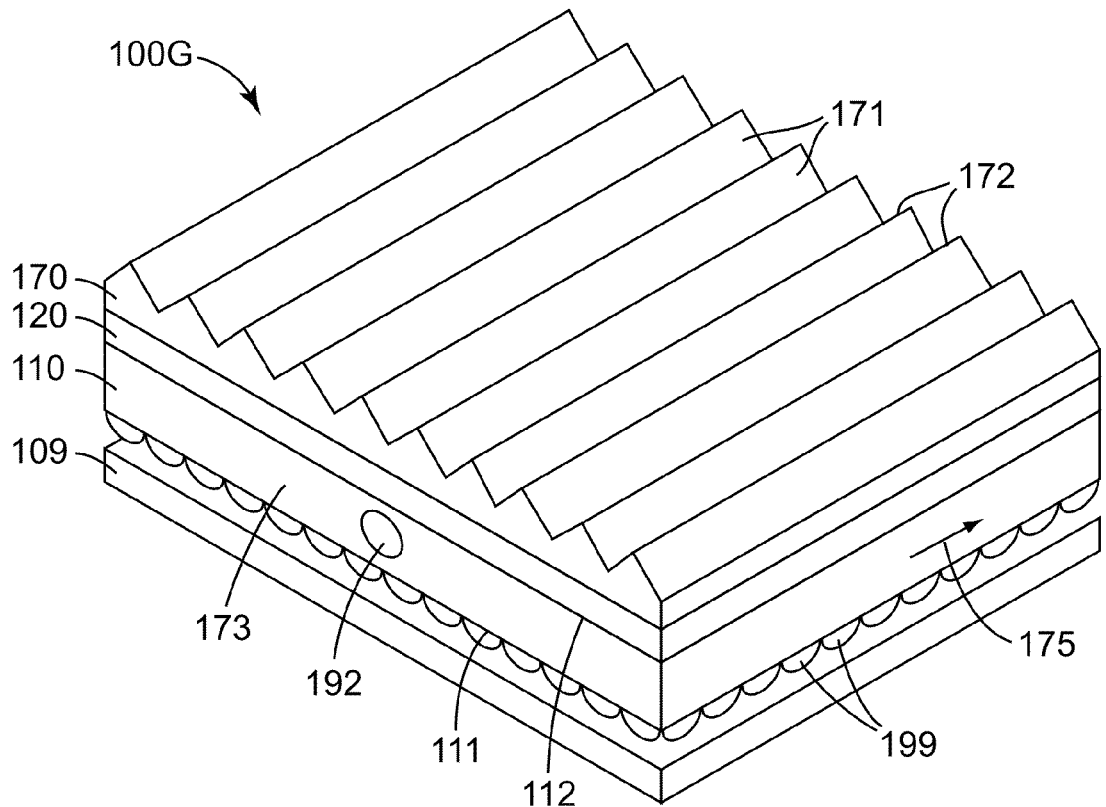

An optical construction 100G is illustrated in FIG. 1G. Optical construction 100G includes a light guide 110 having an optical film 120 disposed on the light guide 110 either directly or indirectly through one or more additional intervening layers (not shown in FIG. 1G). Substantial portions of neighboring major surfaces of respective neighboring layers of optical construction 100G are in physical contact with each other. Light is generated by one or more light sources 192, which may be oriented near an input edge 173 of the light guide 110 as illustrated in FIG. 1G, or may be remote from the light guide 110 with light delivered to the light guide 110 through a delivery means, such as a light fiber or hollow cavity. Light rays enter the light guide 110 at the input edge 173 and are propagated by total internal reflection (TIR) along a light propagation direction 175. The input edge 173 may comprise a flat input edge, a structured surface, and/or may include a recess for the light source.

The major surfaces of 111, 112 of light guide 110 may be substantially parallel as illustrated in FIG. 1G, or the light guide 110 may be wedge-shaped. The light guide 110 may be flat or curved.

A backlight may comprise one or more optical constructions such as optical construction 100G, for example. The backlight 100G may provide light for a liquid crystal display (LCD) panel disposed above the light redirecting film of optical construction 100G, for example.

A backlight may include one or more light guides and/or one or more light sources and/or may include a control system that collectively or individually controls the operation of the light sources and/or other backlight elements.

For example, a backlight may be a tiled system facilitating dynamic backlighting that delivers improved contrast and energy efficiency. Tiled backlights may have overlapping light guide tiles. Each light guide or groups of light guides may be paired with an individually controllable light source. Diffusers can be used to blend discontinuities at the overlapping tile interfaces.

In another example, a backlight may comprise a field sequential system in which the backlight rapidly pulses red, green, blue in sequence, and LCD pixel shutters open and close in sync with the backlight pulsation. The pixels that are open when a given color pulses from the backlight depend on the image being displayed.

In yet another example, the backlight may be a zoned system. Zoned systems selectively dim a portion of the backlight to provide both power savings and improved contrast. This dimming is referred to as zoning, since the backlight is controlled in spatial zones rather than one large panel of light. Zones can be one dimensional or two dimensional. A one dimensional zone is typically a stripe running horizontally across the backlight.

The light guide 110 has one major light emitting surface, however, in some embodiments the light guide may emit light from both major surfaces, for example, to provide light for a double sided display. A portion of the emissive surface of the light guide 110 can be covered with a reflective material. Part of the reflected light is sent (recycled) back into the light guide 110 and emits through the portion of the light guide 110 that is not covered with the reflective material, thus increasing the brightness of that portion. Also, one or more light guide edges may have a reflector proximate or attached to the edge of the light guide 110 to return light transmitted out of an edge back into the light guide 110. The light guide 110 may have one or more beveled edges to facilitate nesting, which is useful, for example, in the tiled systems previously mentioned.

Composition of the light guide may comprise material such as acrylic, polycarbonate, cycloolefin polymer, or copolymers thereof. The light guide may comprise an adhesive light guide. Light extraction features 199 can be disposed on one or both major surfaces of the light guide 110. Light extraction occurs when light is reflected by a light extraction feature 199 at an angle that is less than the critical angle for TIR, thus allowing the light to escape from a light guide surface. The light extraction features 199 may comprise structured features, painted features, printed features, etched features, and/or laser-made features, for example. Selective absorbers can be incorporated in or on any element of the light guide 110, such as UV absorbers, anti-stat, and/or oxygen scavengers.

The light source 192 depicted in FIG. 1G may be used in conjunction with any of the optical constructions depicted herein. For simplicity, only one light source is illustrated in FIG. 1G, although multiple light sources may be used. For example, only one light source that delivers light to only one light guide edge may be used, multiple light sources that deliver light to only one light guide edge may be used, only one light source that delivers light to each of multiple light guide edges may be used, or multiple light sources that deliver light to multiple light guide edges may be used. For example, a rectangular light guide has two major surfaces and four edges. Any one or all of the four edges may be used as an input edge.

Light may be injected into the light guide from regions of the light guide other than a light guide edge. FIG. 4C illustrates a light guide 510 that includes a number of channels 520. Side emitting LEDs 530 are recessed into the channels 520 and emit light 540 into the interior of the light guide 510 at input regions 550.

Figure 4A:
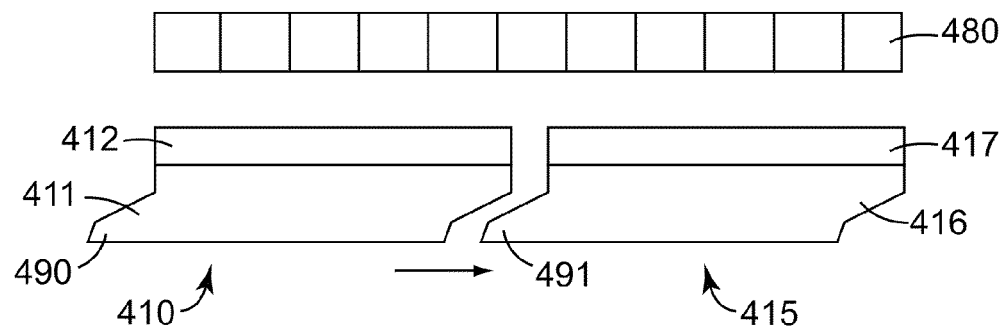
FIG. 4A is a diagram of interleaved optical constructions in accordance with embodiments of the invention.
Figure 4B:
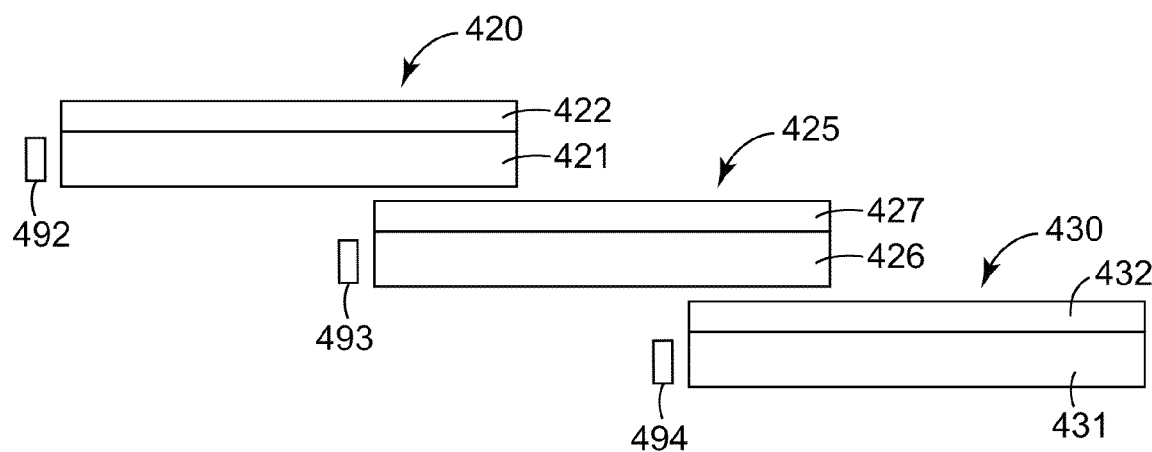
FIG. 4B is a diagram of tiled optical constructions in accordance with embodiments of the invention.
Figure 4C:
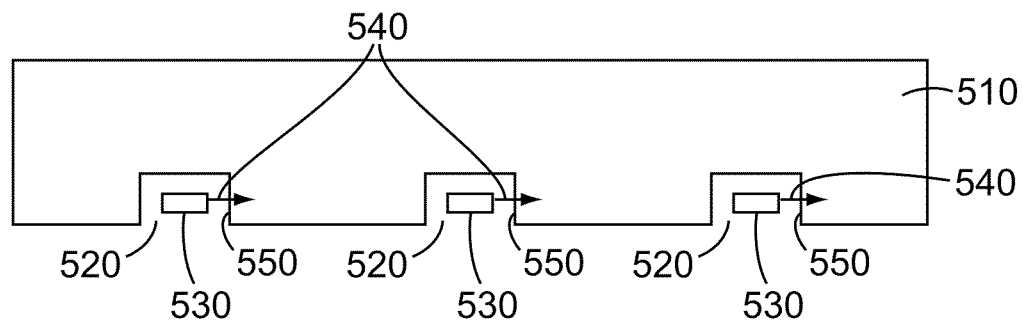
FIG. 4C is a diagram of a light guide having a number of channels with LED light sources recessed therein.
Figure 4D:
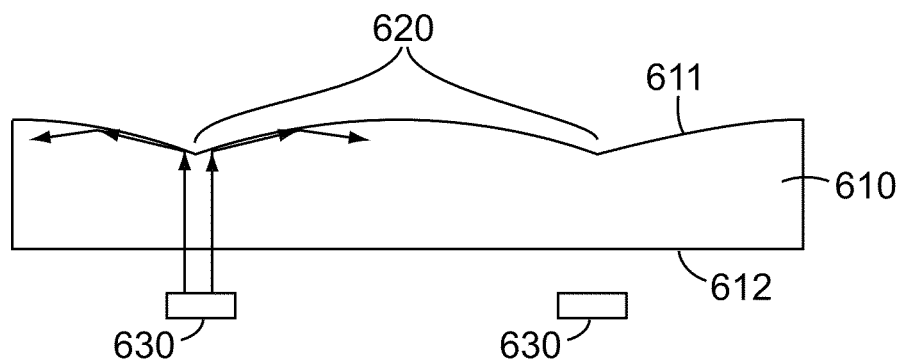
FIG. 4D shows a light guide having surface features that redirect light injected from a light guide surface to angles within the TIR range of the light guide.

In another implementation, one or more relief shapes on the light guide may be used to redirect light injected from a light guide surface, as illustrated in FIG. 4D. In this example, the LEDs 630 are forward emitting, and the top surface 611 of the light guide 620 includes relief shapes 620. The relief shapes 620 re-direct the light injected from the bottom surface 612 to within the angles for TIR. This re-directing reflection that occurs at surface relief shapes 620 can be chosen to function by TIR, or alternatively, a reflective coating such as silver can be used to coat the surface relief shapes 620.

Returning to FIG. 1G, the light source 192 may be of any suitable type and may comprise one or more cold cathode fluorescent lamps (CCFLs) and/or one or more light emitting diodes (LEDs), including LEDs that emit red, green, blue (RGB), (red, green, blue, cyan, yellow (RGBCY), down converted light, e.g., down converted UV, blue or violet light. The light source 192 may comprise one or more II-VI light emitting devices, laser diodes, including vertical cavity surface emitting lasers (VCSELs), lasers, photonic lattice structures, with or without a down converter. The light source 192 may comprise various types light sources, e.g., LED light sources which are coupled to the light guide 110 and/or embedded within the light guide 110.

A phosphor can be incorporated in the light source 192 and/or can be included as a remote component near the light entry region or exit region of the light guide 110. One or more light sensors may be used along with a control system to collectively or independently control the light emitted, e.g., the intensity of light emitted, by the one or more light sources 192.

A reflector 109 may be disposed along a surface and/or one or more edges of the light guide 110. Where multiple light sources are used, the reflector 109 may be disposed between the multiple light sources, such as between multiple light sources disposed near an input edge. The reflector may be specular, semi-specular or diffuse. In some cases, the light guide 110 is attached to the reflector 109. If so, an enhanced specular reflector (ESR) can be used. To control leaky mirror losses, the ESR can be attached to the light guide 110 using a low index layer between the light guide 110 and the reflector 109. In some cases, the reflector/light guide construction can be integrated into the chassis of a notebook computer or other device which provides good structural stability and prevents thermal warp of the optical construction and/or other display components.

The optical construction 100G includes a light redirecting film 170 having structured features 171 which in this example are depicted as linear prisms with peaks oriented away from the light guide 110 (prisms up). The structured features may be any TIR promoting replicated surface structures including prisms and/or lenticulars. These surface structures can be continuous, piecewise continuous, and the dimensions of the features may have chaos variation. Though primarily linear structures are used, in-plane serpentine variations and/or variations in height along the peaks 172 or from peak to peak of the linear structures may be imposed. The structured features 171 are oriented so that they reflect light rays that exit the light guide at angles less than the critical angle required to escape the light guide, but greater than the critical angle for TIR at the structured surface of the light redirecting layer 170. These light rays do not exit from the free surface of the light redirecting film 170, but are subject to the second tier of reflection in the optical construction 100G. In the case of linear prisms, the orientation of the structured features that provide the second tier of TIR is substantially parallel to the direction of light propagation 175 within the light guide 110.

Optical films with prisms oriented away from the major exit surface 112 of the light guide 110 can operate as light recycling films to enhance light source brightness within a desired range of light exit angles. The amplitude of the peaks 172 of the linear prisms 171 may vary from prism to prism, or may vary along the peak 172 of a particular prism 171. In some examples, a first group of peaks 172 may have a height that is greater than a second group of peaks 172. These variations may be desirable to reduce visual defects such as wet-out or Moire effects.

The light redirecting layer 170 may be manufactured from suitable polymeric, acrylic, polycarbonate, UV-cured acrylate, or like materials, for example. A bulk diffusing material could be incorporated into the light redirecting layer 170, although in many cases this will degrade the performance of the optical film. Unitary, extruded layers of acrylics and polycarbonates may be used. Alternatively, the light redirecting layer may be a two part construction, in which the structured surface according is cast and cured on a substrate. For example, ultraviolet-cured acrylics cast on polyester substrates may be used. Polyethylene terphthalate ("PET") may be used as a substrate on which the structured features are cured. Biaxially oriented PET is often preferred for its mechanical and optical properties. A smooth polyester film that may be used as a substrate is commercially available from ICI Americas Inc. Hopewell, Va. under the tradename MELINEX 617. A matte finish coating that may be applied on a film to be used as a substrate is commercially available from Tekra Corporation of New Berlin, Wis. under the tradename MARNOT. 75 GU. The use of a matte finish coating may effect the brightness enhancement achievable using the techniques described herein, however, the matte finish may be otherwise desirable for certain applications. The index of refraction of the light redirecting layer 170 may be adjusted by varying the composition of the layer.

As previously discussed, one or more intervening layers (including one or more light redirecting layers) may be disposed between the light redirecting film 170 and low index optical film 120.

Figure 1H:
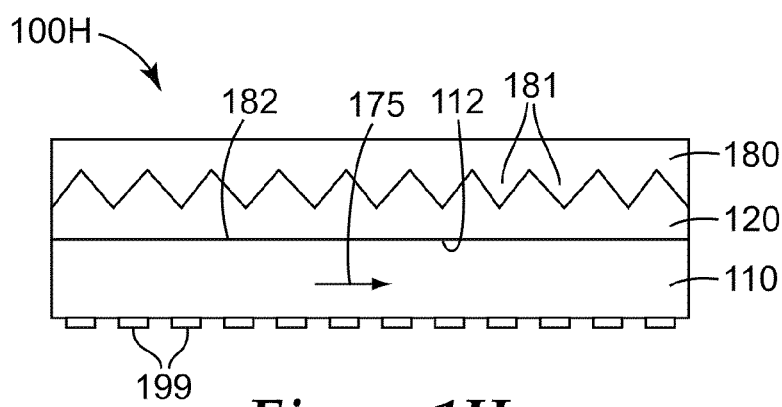

FIG. 1H illustrates an optical construction 1 OOH, wherein the light redirecting film 180 includes structured features 181 that are oriented toward the major light exit surface 112 of the light guide 110 (prisms down). Substantial portions of neighboring major surfaces of respective neighboring layers of optical construction 100H are in physical contact with each other. An optical film with prisms oriented toward the major exit surface 112 of the light guide 110 can operate as a turning film which collimates light that exits from the light guide 110. The structured features, e.g., linear prisms 181, are arranged substantially perpendicular to the light propagation axis 175. In the optical construction 100H, the material of the optical film 120 is disposed between the prisms of the turning film 180 and has a planar surface 182 which is either disposed directly on the major exit surface 112 of the light guide 110, or is disposed indirectly on the major surface 112 of the light guide 110 through one or more intervening layers (not shown in FIG. 1H).

Figure 1I:
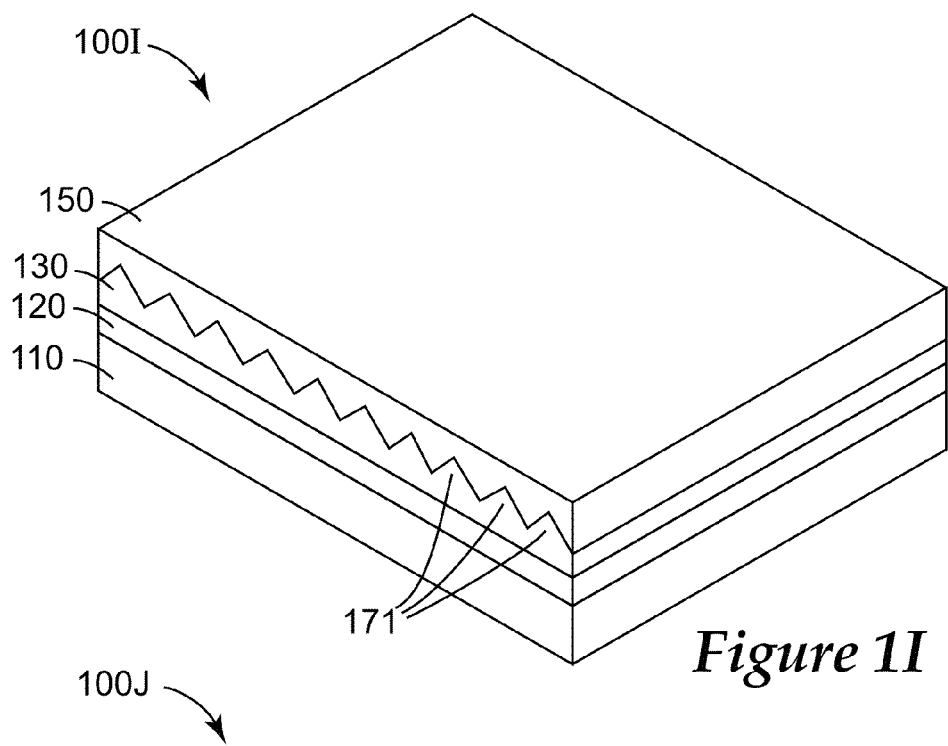

FIG. 1I illustrates an optical construction 100I in which a second low index film 150 is disposed on a surface of the light redirecting film 130. Optical construction 100I includes a light guide 110, first low index optical film 120, and a light redirecting film 130. One or more additional layers may be disposed between the layers of optical construction 100I, e.g., a high absorption layer may be disposed between the first low index optical film 120 and the light redirecting film 130 and/or one or more adhesive layers may be disposed between the light guide 110 and the first low index optical film 120 and/or between the first low index optical film 120 and the light redirecting film 130. The second low index optical film 150 is disposed between the structured features 171 of the light redirecting film and planarizes the surface of the optical construction 100I. The optical construction 100I has the advantage of reducing dust sensitivity and reducing high angle light. Additionally, the low index film 150 allows the construction to be attached directly to an LCD panel, such as for a cell phone. This construction may be used to provide a compact, thin, self-contained illumination/image generation module.

Figure 1J:
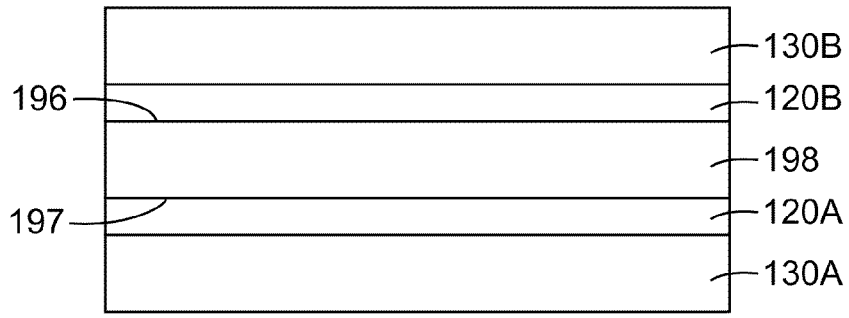

In some embodiments, e.g., dual-sided displays or signs, the light guide may emit light from both major surfaces as illustrated in FIG. 1J. Optical construction 100J includes a light guide 198 with two major emissive surfaces 197, 196. Low index films 120A, 120B are respectively disposed directly or indirectly on the two major emissive surfaces 197, 196 of the light guide 198. Extraction features for the dual-sided light guide may include hazy low index coating on both surfaces 197, 198, for example. A high absorption layer and/or light redirecting films 130A, 130B are disposed directly or indirectly on the low index films 120A, 120B. Substantial portions of neighboring major surfaces of respective neighboring layers of optical construction 100J are in physical contact with each other. Optical construction 100J is useful to provide dual sided illumination, e.g., for dual sided signs or displays. Optical adhesive layers are optionally used between one or more of the layers of optical construction 100J illustrated in FIG. 1J to adhere neighboring layers together.

Figure 2:
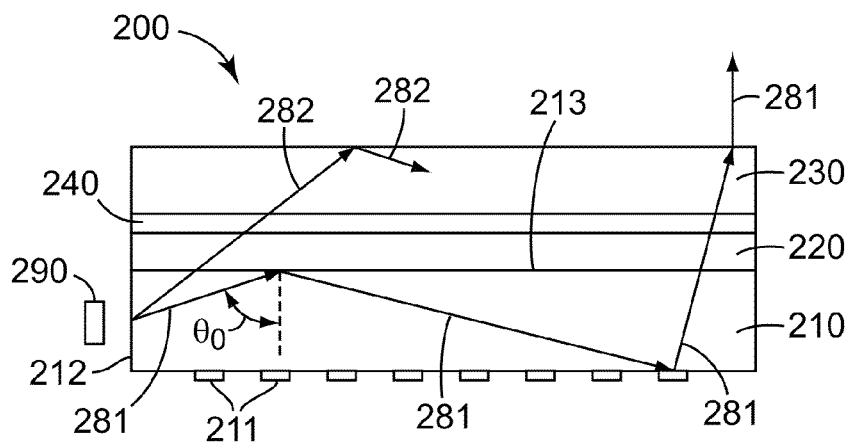
FIG. 2 is a diagram illustrating the operation of two tiered reflection in an optical construction in accordance with embodiments of the invention.

FIG. 2 illustrates two-tiered reflection of light that occurs in an optical construction in accordance with embodiments of the invention. Light is generated by light source 290 and is coupled into the light guide 210 at a light input edge 212. The light guide 210 has index of refraction N1 and absorption A1.

The optical construction 200 includes low index optical film 220, which has an index of refraction of N2 and absorption A2 disposed directly or indirectly on the light guide 210, where N2<N1. For example, in some implementations, the light guide 210 is acrylic, which has an index of refraction of 1.49. The low index optical film 220 may have an index of refraction less than 1.49, for example, less than 1.35, or in a range of about 1.10 to about 1.35. A reflective polarizer 240 is disposed directly or indirectly on low index optical film 220. The reflective polarizer 240 has an absorption A3 which is greater than the absorption A1 of the light guide 210 and the absorption A2 of the low index optical film 220. A light redirecting film 230 is disposed directly or indirectly on the reflective polarizer 240. Substantial portions of neighboring major surfaces neighboring layers in optical construction 200 are in physical contact with each other.

Optical construction 200 provides two tiers of light reflection to reduce light leaked from the light source, thereby enhancing efficiency and reducing optical defects. The first tier of reflection occurs at the major light exit surface 213 of light guide 210. The index of refraction, N2, of the low index optical film 220 is less than the index of refraction N1 of the light guide 210. Due to the difference between the refractive indices N1, N2, most of the light entering the light guide 210 is propagated within the light guide 210 by TIR that occurs at the light guide surface 213. However, light coupled into the light guide 210 may propagate to the surface 213 at an angle of incidence that is less than the critical angle for TIR. This light is not reflected at the surface 213 and leaks out of the light guide prematurely, i.e., before it is extracted by light extraction features 211. If allowed to escape from the optical construction 200, the prematurely extracted light would produce visual artifacts and non-uniformity. The severity of the artifacts and non-uniformity would depend on the difference between the refractive index of the light guide 210 and the refraction index of the low index optical film 220. However, this potential problem is mitigated by the second tier of TIR which is provided by light redirecting film 230.

The first tier of TIR is illustrated by the path of light ray 281 that enters the light guide at input edge 212. Because the initial angle of incidence 00 of light ray 281 at the major light exit surface 213 of the light guide 210 is greater than the critical angle for TIR, the light ray 281 is reflected at the surface 213 in accordance with Snell's law. After reflection, light ray 281 continues propagating through the light guide 210 until it strikes an extraction feature 211. Light ray 281 is reflected by extraction feature 211 and again encounters the major light exit surface 213. However, after being reflected by the extraction feature 212, the angle of incidence of light ray 281 at the surface 213 is less than the critical angle, allowing the light ray 281 to escape from light guide 210. Light ray 281 may be refracted by the light redirecting film 230 as the light ray 281 exits the optical construction 200.

The second tier of TIR is illustrated by the path of light ray 282. The initial angle of incidence of light ray 282 at the surface 213 of the light guide 210 is less than the critical angle for TIR allowing light ray 282 to leak from the light guide 210. Light ray 282 continues its journey through low index film 220 and polarizer 240 and enters light redirecting film 230. Structured features of the light redirecting film 230 are oriented to reflect light leaking from the light guide at angles less than the critical angle at the structured surface of the light redirecting layer 130. The angle of incidence of light ray 282 on the refractive structures of light redirecting layer is less than the critical angle for TIR at the surface of the light redirecting film 230, and light ray 282 is reflected by the light redirecting film 230, reentering the light guide 210 and continuing its propagation until it encounters an extraction structure 211 and exits the light guide 210 at an angle that is not subject to TIR by the light redirecting film 230.

Although two tiers of light reflection are illustrated in FIG. 2, it will be appreciated that one or more additional tiers of light reflection may be achieved through the addition of one or more additional layers.

A more detailed view of a low index film is illustrated in FIG. 3. Low index film 300A has a porous interior by virtue of the presence of network of voids 320 within the low index film 300A. Low index film 300A may also include a plurality of particles 340 dispersed within a binder 310. In general, the low index film 300A can include one or more networks of interconnected pores or voids. For example, network of voids 320 can be regarded to include interconnected voids or pores 320A-320C. The voids 320 may be connected to one another via hollow tunnels or hollow tunnel-like passages. The voids 320 are not necessarily free of all matter and/or particulates. For example, in some cases, a void may include one or more small fiber- or string-like objects that include, for example, a binder and/or nano-particles. In some configurations, low index film 300A includes multiple pluralities of interconnected voids or multiple networks of voids where the voids in each plurality or network are interconnected. In some cases, in addition to multiple pluralities of interconnected voids, the low index film 300A includes a plurality of closed or unconnected voids meaning that the voids are not connected to other voids via tunnels.

Low index optical film 300A supports total internal reflection (TIR) by virtue of including a plurality of voids. When light that travels in an optically clear non-porous medium is incident on a stratum possessing high porosity, the reflectivity of the incident light is much higher at oblique angles than at normal incidence. In the case of no or low haze voided films, the reflectivity at oblique angles greater than the critical angle is close to about 100%. In such cases, the incident light undergoes total internal reflection (TIR).

The voids in the low index optical films have an index of refraction $n_v$ and a permittivity $\epsilon_v$, where $n_v^2 = \epsilon_v$, and the binder has an index of refraction $\epsilon_b$ and a permittivity $\epsilon_b$, where $n_b^2 = \epsilon_b$. In general, the interaction of an optical film with light, such as light that is incident on, or propagates in, the optical film, depends on a number of film characteristics such as, for example, the film thickness, the binder index, the void or pore index, the pore shape and size, the spatial distribution of the pores, and the wavelength of light. In some cases, light that is incident on or propagates within the optical film, "sees" or "experiences" an effective permittivity $\in_{eff}$ and an effective index $n_{eff}$, where $n_{eff}$ can be expressed in terms of the void index $n_v$, the binder index $n_b$, and the film porosity or void volume fraction "f". In such cases, the optical film is sufficiently thick and the voids are sufficiently small so that light cannot resolve the shape and features of a single or isolated void. In such cases, the size of at least a majority of the voids, such as at least 60% or 70% or 80% or 90% of the voids, is not greater than about $\lambda/5$, or not greater than about $\lambda/6$, or not greater than about $\lambda/8$, or not greater than about $\lambda/10$, or not greater than about $\lambda/20$, where $\lambda$ is the wavelength of light.

In some cases, light that is incident on an optical film is a visible light meaning that the wavelength of the light is in the visible range of the electromagnetic spectrum. In such cases, the visible light has a wavelength that is in a range from about 380 nm to about 750 nm, or from about 400 nm to about 700 nm, or from about 420 nm to about 680 nm. In such cases, the optical film can reasonably be assigned an effective index of refraction if the size of at least a majority of the voids, such as at least 60% or 70% or 80% or 90% of the voids, is not greater than about 70 nm, or not greater than about 60 nm, or not greater than about 50 nm, or not greater than about 40 nm, or not greater than about 30 nm, or not greater than about 20 nm, or not greater than about 10 nm.

In some cases, the low index optical film is sufficiently thick so that the optical film can reasonably have an effective index that can be expressed in terms of the indices of refraction of the voids and the binder, and the void or pore volume fraction or porosity. In such cases, the thickness of the low index optical film is not less than about 100 nm, or not less than about 200 nm, or not less than about 500 nm, or not less than about 700 nm, or not less than about 1000 nm.

When the voids in the low index optical film are sufficiently small and the optical film is sufficiently thick, the optical film has an effective permittivity $\in_{eff}$ that can be expressed as:

$$\in_{eff} = f\in_v + (1-f)\in_b \quad (1)$$

In such cases, the effective index $n_{eff}$ of the optical film can be expressed as:

$$n_{eff}^2 = fn_v^2 + (1-f)n_b^2 \quad (2)$$

In some cases, such as when the difference between the indices of refraction of the pores and the binder is sufficiently small, the effective index of the optical film can be approximated by the following expression:

$$n_{eff} = fn_v + (1-f)n_b \quad (3)$$

In such cases, the effective index of the low index optical film is the volume weighted average of the indices of refraction of the voids and the binder. For example, an optical film that has a void volume fraction of about 50% and a binder that has an index of refraction of about 1.5, has an effective index of about 1.25.

In some cases, the optical haze of low index optical film 300A is not greater than about 5%, or not greater than about 4%, or not greater than about 3.5%, or not greater than about 4%, or not greater than about 3%, or not greater than about 2.5%, or not greater than about 2%, or not greater than about 1.5%, or not greater than about 1%. In such cases, the effective index of the low index optical film is not greater than about 1.35, or not greater than about 1.3, or not greater than about 1.25, or not greater than about 1.2, or not greater than about 1.15, or not greater than about 1.1, or not greater than about 1.05. In such cases, the thickness of low index optical film 300A is not less than about 100 nm, or not less than about 200 nm, or not less than about 500 nm, or not less than about 700 nm, or not less than about 1,000 nm, or not less than about 1500 nm, or not less than about 2000 nm.

A local volume fraction of interconnected voids, for example a first local volume fraction of interconnected voids 370A and a second volume fraction of interconnected voids 375A, can vary along a thickness $t_1$ direction within low index optical film 300A. The local volume fraction of interconnected voids, and void size distribution, can vary along the thickness direction in several ways as shown, for example, in FIGS. 3B-3G, described elsewhere. In some cases, the gradient optical film is a porous film meaning that the network of voids 320 forms one or more passages between first and second major surfaces 330 and 332, respectively.

The network of voids 320 can be regarded to include a plurality of interconnected voids. Some of the voids can be at a surface of the optical film 300A and can be regarded to be surface voids. For example, in the exemplary optical film 300A, voids 320D and 320E are at a second major surface 332 of the low index optical film and can be regarded as surface voids 320D and 320E, and voids 320F and 320G are at a first major surface 330 of the optical film 300A and can be regarded as surface voids 320F and 320G. Some of the voids, such as for example voids 320B and 320C, are within the interior of the optical film and away from the exterior surfaces of the optical film and can be regarded as interior voids 320B and 320C, even though an interior void can be connected to a major surface via, for example, other voids.

Voids 320 have a size $d_1$ that can generally be controlled by choosing suitable composition and fabrication techniques, such as coating, drying and curing conditions. In general, $d_1$ can be any desired value in any desired range of values. For example, in some cases, at least a majority of the voids, such as at least 60% or 70% or 80% or 90% or 95% of the voids, have a size that is in a desired range. For example, in some cases, at least a majority of the voids, such as at least 60% or 70% or 80% or 90% or 95% of the voids, have a size that is not greater than about 10 microns, or not greater than about 7 microns, or not greater than about 5 microns, or not greater than about 4 microns, or not greater than about 3 microns, or not greater than about 2 microns, or not greater than about 1 micron, or not greater than about 0.7 microns, or not greater than about 0.5 microns.

In some cases, plurality of interconnected voids 320 has an average void or pore size that is not greater than about 5 microns, or not greater than about 4 microns, or not greater than about 3 microns, or not greater than about 2 microns, or not greater than about 1 micron, or not greater than about 0.7 microns, or not greater than about 0.5 microns.

In some cases, some of the voids can be sufficiently small so that their primary optical effect is to reduce the effective index, while some other voids can reduce the effective index and scatter light, while still some other voids can be sufficiently large so that their primary optical effect is to scatter light.

Particles 340 have a size $d_2$ that can be any desired value in any desired range of values. For example, in some cases at least a majority of the particles, such as at least 60% or 70% or 80% or 90% or 95% of the particles, have a size that is in a desired range. For example, in some cases, at least a majority of the particles, such as at least 60% or 70% or 80% or 90% or 95% of the particles, have a size that is not greater than about 5 microns, or not greater than about 3 microns, or not greater than about 2 microns, or not greater than about 1 micron, or not greater than about 700 nm, or not greater than about 500 nm, or not greater than about 200 nm, or not greater than about 100 nm, or not greater than about 50 nm.

In some cases, plurality of particles 340 has an average particle size that is not greater than about 5 microns, or not greater than about 3 microns, or not greater than about 2 microns, or not greater than about 1 micron, or not greater than about 700 nm, or not greater than about 500 nm, or not greater than about 200 nm, or not greater than about 100 nm, or not greater than about 50 nm.

In some cases, some of the particles can be sufficiently small so that they primary affect the effective index, while some other particles can affect the effective index and scatter light, while still some other particles can be sufficiently large so that their primary optical effect is to scatter light.

In some cases, $d_1$ and/or $d_2$ are sufficiently small so that the primary optical effect of the voids and the particles is to affect the effective index of low index optical film 300A. For example, in such cases, $d_1$ and/or $d_2$ are not greater than about $\lambda/5$, or not greater than about $\lambda/6$, or not greater than about $\lambda/8$, or not greater than about $\lambda/10$, or not greater than about $\lambda/20$, where $\lambda$ is the wavelength of light. As another example, in such cases, $d_1$ and $d_2$ are not greater than about 70 nm, or not greater than about 60 nm, or not greater than about 50 nm, or not greater than about 40 nm, or not greater than about 30 nm, or not greater than about 20 nm, or not greater than about 10 nm. In such cases, the voids and the particles may also scatter light, but the primary optical effect of the voids and the particles is to define an effective medium in the optical film that has an effective index. The effective index depends, in part, on the indices of refraction of the voids, the binder, and the particles. In some cases, the effective index is a reduced effective index, meaning that the effective index is less than the index of the binder and the index of the particles.

In cases where the primary optical effect of the voids and/or the particles is to affect the index, $d_1$ and $d_2$ are sufficiently small so that a substantial fraction, such as at least about 60%, or at least about 70%, or at least about 80%, or at least about 90%, or at least about 95% of voids 320 and particles 340 have the primary optical effect of reducing the effective index. In such cases, a substantial fraction, such as at least about 60%, or at least about 70%, or at least about 80%, or at least about 90%, or at least about 95% the voids and/or the particles, have a size that is in a range from about 1 nm to about 200 nm, or from about 1 nm to about 150 nm, or from about 1 nm to about 100 nm, or from about 1 nm to about 50 nm, or from about 1 nm to about 20 nm.

In some cases, the index of refraction $n_1$ of particles 340 can be sufficiently close to the index $n_b$ of binder 310, so that the effective index does not depend, or depends very little, on the index of refraction of the particles. In such cases, the difference between $n_1$ and $n_b$ is not greater than about 0.01, or not greater than about 0.007, or not greater than about 0.005, or not greater than about 0.003, or not greater than about 0.002, or not greater than about 0.001. In some cases, particles 340 are sufficiently small and their index is sufficiently close to the index of the binder, that the particles do not primarily scatter light or affect the index. In such cases, the primary effect of the particles can, for example, be to enhance the strength of low index film 300A. In some cases, particles 340 can enhance the process of making the low index optical film, although low index optical film 300A can be made with no particles.

In cases where the primary optical effect of network of voids 320 and particles 340 is to affect the effective index and not to, for example, scatter light, the optical haze of low index film 300A that is due to voids 320 and particles 340 is not greater than about 5%, or not greater than about 4%, or not greater than about 3.5%, or not greater than about 4%, or not greater than about 3%, or not greater than about 2.5%, or not greater than about 2%, or not greater than about 1.5%, or not greater than about 1%. In such cases, the effective index of the effective medium of the low index optical film 300A is not greater than about 1.35, or not greater than about 1.3, or not greater than about 1.25, or not greater than about 1.2, or not greater than about 1.15, or not greater than about 1.1, or not greater than about 1.05.

The thickness of the low index optical film may be not less than about 100 nm, or not less than about 200 nm, or not less than about 500 nm, or not less than about 700 nm, or not less than about 1,000 nm, or not less than about 1500 nm, or not less than about 2000 nm.

For light normally incident on low index optical film 300A, optical haze, as used herein, is defined as the ratio of the transmitted light that deviates from the normal direction by more than 4 degrees to the total transmitted light. Haze values disclosed herein were measured using a Haze-guard Plus haze meter (BYK-Gardiner, Silver Springs, Md.) according to the procedure described in ASTM D1003.

Low index film 300A is sufficiently thick so that the evanescent tail of a light ray that undergoes total internal reflection at a surface of the low index film 300A, does not optically couple, or optically couples very little, across the thickness of the low index film. In such cases, the thickness $t_1$ of low index film 300A is not less than about 1 micron, or not less than about 1.1 micron, or not less than about 1.2 microns, or not less than about 1.3 microns, or not less than about 1.4 microns, or not less than about 1.5 microns, or not less than about 1.7 microns, or not less than about 2 microns. A sufficiently thick low index film 300A can prevent or reduce an undesired optical coupling of the evanescent tail of an optical mode across the thickness of the low index optical film.

In general, low index film 300A can have any porosity or void volume fraction that may be desirable in an application. In some cases, the volume fraction of plurality of voids 320 in low index optical film 300A is not less than about 20%, or not less than about 30%, or not less than about 40%, or not less than about 50%, or not less than about 60%, or not less than about 70%, or not less than about 80%, or not less than about 90%.

In some cases, low index film 300A includes a plurality of particles 340 dispersed in binder 310. Particles 340 can have any size that may be desirable in an application. For example, in some cases at least a majority of the particles, such as at least 60% or 70% or 80% or 90% or 95% of the particles, have a size that is in a desired range. For example, in some cases, at least a majority of the particles, such as at least 60% or 70% or 80% or 90% or 95% of the particles, have a size that is not greater than about 5 microns, or not greater than about 3 microns, or not greater than about 2 microns, or not greater than about 1 micron, or not greater than about 700 nm, or not greater than about 500 nm, or not greater than about 200 nm, or not greater than about 100 nm, or not greater than about 50 nm.

In some cases, plurality of particles 340 has an average particle size that is not greater than about 5 microns, or not greater than about 3 microns, or not greater than about 2 microns, or not greater than about 1 micron, or not greater than about 700 nm, or not greater than about 500 nm, or not greater than about 200 nm, or not greater than about 100 nm, or not greater than about 50 nm.

In some cases, particles 340 are sufficiently small so that the primary optical effect of the particles is to affect the effective index of low index film 300A. For example, in such cases, particles have an average size that is not greater than about $\lambda/5$, or not greater than about $\lambda/6$, or not greater than about $\lambda/8$, or not greater than about $\lambda/10$, or not greater than about λ/20, where λ is the wavelength of light. As another example, the average particle size is not greater than about 70 nm, or not greater than about 60 nm, or not greater than about 50 nm, or not greater than about 40 nm, or not greater than about 30 nm, or not greater than about 20 nm, or not greater than about 10 nm.

In the exemplary low index film 300A, particles 340, such as particles 340A and 340B, are solid particles. In some cases, low index optical film 300A may additionally or alternatively include a plurality of hollow or porous particles 350.

Particles 340 can be any type particles that may be desirable in an application. For example, particles 340 can be organic or inorganic particles. For example, particles 340 can be silica, zirconium oxide or alumina particles.

Particles 340 can have any shape that may be desirable or available in an application. For example, particles 340 can have a regular or irregular shape. For example, particles 340 can be approximately spherical. As another example, the particles 340 can be elongated. In such cases, low index optical film 300A includes a plurality of elongated particles 320. In some cases, the elongated particles have an average aspect ratio that is not less than about 1.5, or not less than about 2, or not less than about 2.5, or not less than about 3, or not less than about 3.5, or not less than about 4, or not less than about 4.5, or not less than about 5. In some cases, the particles 340 can be in the form or shape of a string-of-pearls (such as Snowtex-PS particles available from Nissan Chemical, Houston, Tex.) or aggregated chains of spherical or amorphous particles, such as fumed silica.

Particles 340 may or may not be functionalized. In some cases, particles 340 are not functionalized. In some cases, particles 340 are functionalized so that they can be dispersed in a desired solvent or binder 310 with no, or very little, clumping. In some cases, particles 340 can be further functionalized to chemically bond to binder 310. For example, particles 340, such as particle 340A, can be surface modified and have reactive functionalities or groups 360 to chemically bond to binder 310. In such cases, at least a significant fraction of particles 340 is chemically bound to the binder. In some cases, particles 340 do not have reactive functionalities to chemically bond to binder 310. In such cases, particles 340 can be physically bound to binder 310, or binder 310 can encapsulate particles 340.

In some cases, some of the particles 340 have reactive groups and others do not have reactive groups. For example in some cases, about 10% of the particles have reactive groups and about 90% of the particles do not have reactive groups, or about 15% of the particles have reactive groups and about 85% of the particles do not have reactive groups, or about 20% of the particles have reactive groups and about 80% of the particles do not have reactive groups, or about 25% of the particles have reactive groups and about 75% of the particles do not have reactive groups, or about 30% of the particles have reactive groups and about 60% of the particles do not have reactive groups, or about 35% of the particles have reactive groups and about 65% of the particles do not have reactive groups, or about 40% of the particles have reactive groups and about 60% of the particles do not have reactive groups, or about 45% of the particles have reactive groups and about 55% of the particles do not have reactive groups, or about 50% of the particles have reactive groups and about 50% of the particles do not have reactive groups, or about 55% of the particles have reactive groups and about 45% of the particles do not have reactive groups, or about 60% of the particles have reactive groups and about 40% of the particles do not have reactive groups, or about 65% of the particles have reactive groups and about 35% of the particles do not have reactive groups, or about 70% of the particles have reactive groups and about 30% of the particles do not have reactive groups, or about 75% of the particles have reactive groups and about 25% of the particles do not have reactive groups, or about 80% of the particles have reactive groups and about 20% of the particles do not have reactive groups, or about 85% of the particles have reactive groups and about 15% of the particles do not have reactive groups, or about 90% of the particles have reactive groups and about 10% of the particles do not have reactive groups.

In some cases, some of the particles may be functionalized with both reactive and unreactive groups on the same particle.

The ensemble of particles may include a mixture of sizes, reactive and non-reactive particles and different types of particles, for example, organic particles including polymeric particles such as acrylics, polycarbonates, polystyrenes, silicones and the like; or inorganic particles such as glasses or ceramics including, for example, silica and zirconium oxide, and the like.

Binder 310 can be or include any material that may be desirable in an application. For example, binder 310 can be a curable material that forms a polymer, such as a cross-linked polymer. In general, binder 310 can be any polymerizable material, such as a polymerizable material that is radiation-curable, such as a UV curable material.

In general, the weight ratio of binder 310 to plurality of particles 340 can be any ratio that may be desirable in an application. In some cases, the weight ratio of the binder to the plurality of the particles is not less than about 1:1, or not less than about 1.5:1, or not less than about 2:1, or not less than about 2.5:1, or not less than about 3:1, or not less than about 3.5:1, or not less than about 4:1.

In some cases, low index optical film 300A includes a binder, a fumed metal oxide such as a fumed silica or alumina, and a plurality or network of interconnected voids. In such the weight ratio of the fumed metal oxide to the binder is in a range from about 2:1 to about 6:1, or in a range from about 2:1 to about 4:1. In some cases, the weight ratio of the fumed metal oxide to the binder is not less than about 2:1, or not less than about 3:1. In some cases, the weight ratio of the fumed metal oxide to the binder is not greater than about 8:1, or not greater than about 7:1, or not greater than about 6:1.

Figure 5:
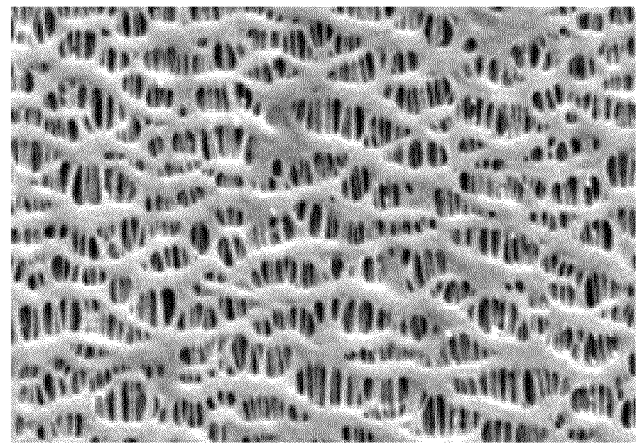
FIGS. 5-7 are optical micrographs of porous low index optical films in accordance with embodiments of the invention.

In some cases, low index optical film 300A can be or include a porous polypropylene and/or polyethylene film such as a CELGARD film available from Celanese Separation Products of Charlotte, N.C.). For example, low index optical film 300A can be or include a CELGARD 2500 film having a thickness of about 25 microns and 55% porosity. As another example, low index optical film 300A can be or include a CELGARD M824 film having a thickness of about 12 microns and 38% porosity. FIG. 5 is an exemplary optical image of a CELGARD film.

Figure 6:
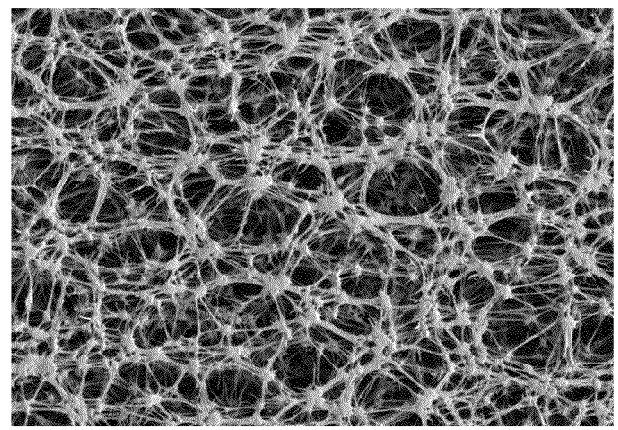

In some cases, low index optical film 300A can be or include a porous film that is made by thermally induced phase separation (TIPS), such as those made according to the teachings of U.S. Pat. Nos. 4,539,256 and 5,120,594. TIPS films can have a broad range of microscopic pore sizes. FIG. 6 is an exemplary optical image of a TIPS film.

Figure 7:
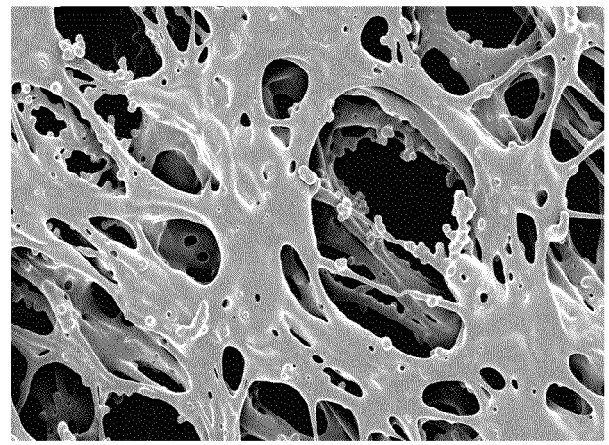

In some cases, low index optical film 300A can be or include a porous film that is made by solvent induced phase separation (SIPS), an exemplary optical micrograph of which is shown in FIG. 7. In some cases, optical film 120 can be or include a polyvinylidene fluoride (PVDF) porous film.

Low index optical film 300A can comprise the optical films described in co-pending applications: "Optical Film" filed Apr. 15, 2009 and having Ser. No. 61/169,466; "Gradient Low Index Article and Method" filed Oct. 24, 2009 and having Ser. No. 61/254,673; U.S. Provisional Application No. 61/169,532 entitled "Retroreflecting Optical Construction" filed Apr. 15, 2009 which are incorporated herein by reference.

Low index optical film 300A can be produced using any method that may be desirable in an application. In some cases, optical film 300A can be produced by the processes described in co-pending applications: U.S. Provisional Application No. 61/169,429 entitled "PROCESS AND APPARATUS FOR A NANOVOIDED ARTICLE", filed Apr. 15, 2009; U.S. Provisional Application No. 61/169,427 entitled "PROCESS AND APPARATUS FOR COATING WITH REDUCED DEFECTS", filed Apr. 15, 2009; and U.S. Provisional Application No. 61/254,674 entitled "PROCESS FOR GRADIENT NANOVOIDED ARTICLE", filed Oct. 24, 2009, the disclosures of which are incorporated in their entirety herein by reference.

For example, the low index optical film may comprise a gel-type film as described in U.S. Provisional Application No. 61/169,466 entitled "Optical Film" (produced by processes described in U.S. Provisional Application No. 61/169,429 entitled "PROCESS AND APPARATUS FOR A NANO-VOIDED ARTICLE"). The low index optical film may comprise a fumed silica film described in U.S. Provisional Application No. 61/169,532 entitled "Retroreflecting Optical Construction".

Generally, in one process, first a solution is prepared that includes a plurality of particles, such as nano-particles, and a polymerizable material dissolved in a solvent, where the polymerizable material can include, for example, one or more types of monomers. Next, the polymerizable material is polymerized, for example by applying heat or light, to form an insoluble polymer matrix in the solvent. In one particular embodiment, the polymerization occurs in an environment that has an elevated level of oxygen adjacent one of the surfaces, inhibiting the polymerization near that surface to create a gradient optical film. In one particular embodiment, a concentration of photoinitiator near one of the surfaces is increased relative to another surface, to create a gradient optical film.

In some cases, after the polymerization step, the solvent may still include some of the polymerizable material, although at a lower concentration. Next, the solvent is removed by drying or evaporating the solution resulting in low index optical film 300A that includes a network, or a plurality, of voids 320 dispersed in polymer binder 310. The gradient optical film further includes plurality of particles 340 dispersed in the polymer. The particles are bound to the binder, where the bonding can be physical or chemical, or be encapsulated by the binder.

Low index optical film 300A can have other materials in addition to binder 310 and particles 340. For example, low index optical film 300A can include one or more additives, such as for example, coupling agents, to help wet the surface of a substrate on which the gradient optical film is formed. As another example, low index optical film 300A can include one or more colorants, such a carbon black, for imparting a color, such as the black color, to the low index optical film 300A. Other exemplary materials in low index optical film 300A include initiators, such as one or more photo-initiators, anti-stats, UV absorbers and release agents. In some cases, low index optical film 300A can include a down converting material that is capable of absorbing light and reemitting a longer wavelength light. Exemplary down converting materials include phosphors.

In general, low index optical film 300A can have a desirable porosity for any weight ratio of binder 310 to plurality of particles 340. Accordingly, in general, the weight ratio can be any value that may be desirable in an application. In some cases, the weight ratio of binder 310 to plurality of particles 340 is not less than about 1:2.5, or not less than about 1:2.3, or not less than about 1:2, or not less than about 1:1, or not less than about 1.5:1, or not less than about 2:1, or not less than about 2.5:1, or not less than about 3:1, or not less than about 3.5:1, or not less than about 4:1, or not less than about 5:1. In some cases, the weight ratio is in a range from about 1:2.3 to about 4:1.

In some cases, top major surface 332 of low index optical film 300A can be treated to, for example, improve the adhesion of the low index optical film to another layer. For example, the top surface can be corona treated.

In some embodiments, the low index optical films have a substantially constant porosity along a thickness direction. In other embodiments, the low index optical films exhibit a local porosity that varies along a thickness direction of the low index optical films. Optical films exhibiting a variation in local porosity along the thickness direction are denoted herein as gradient films or gradient low index films. In some cases, the local porosity may be described by a local void volume fraction, or as a local pore size distribution. For example, a gradient optical film may have a first local volume fraction and a second local volume fraction, wherein the second volume fraction of the plurality of voids is less than 50%, 20%, 10%, or 1% of the first volume fraction.

Figure 3A:
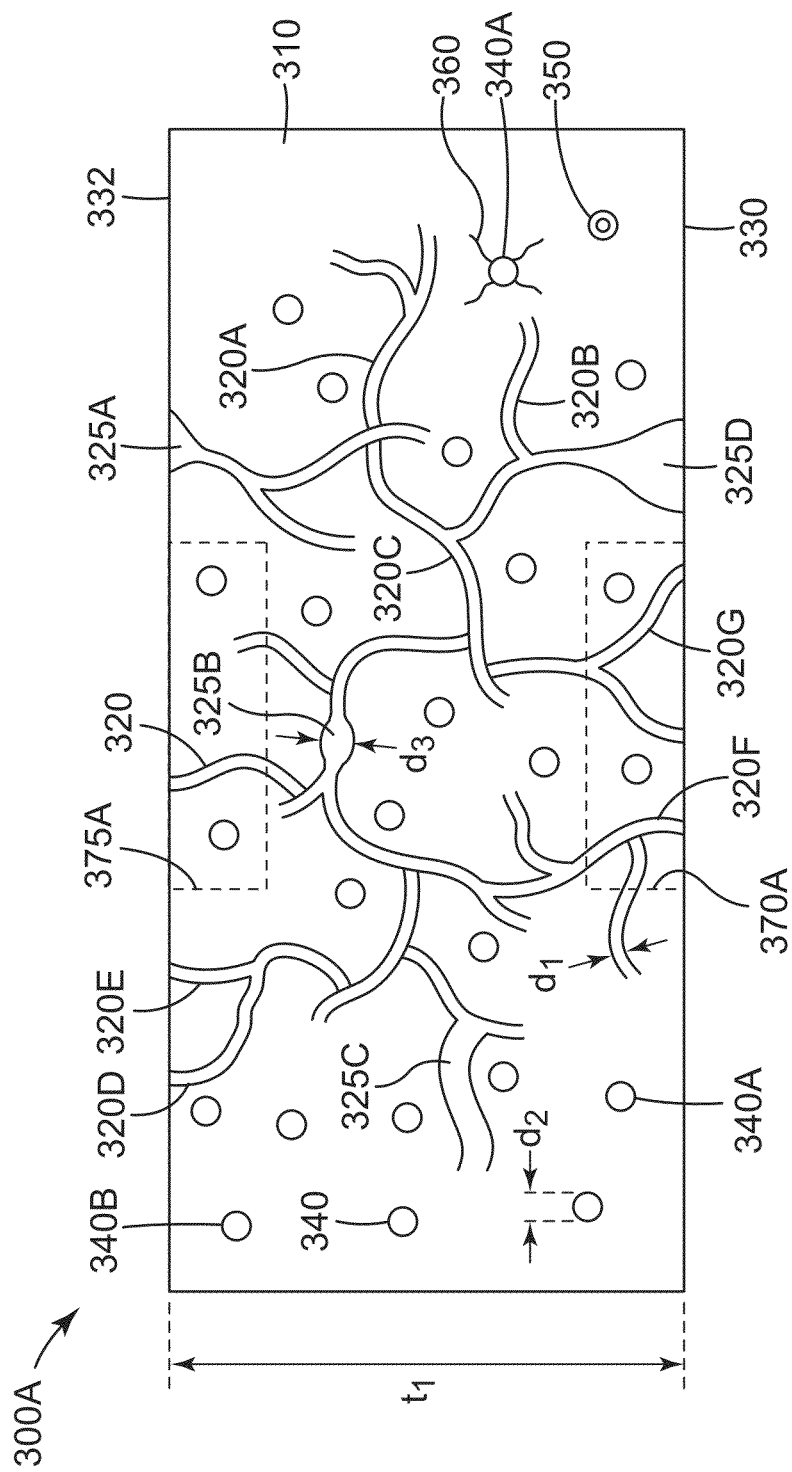
FIG. 3A is a schematic side view of a low index optical film in accordance with embodiments of the invention.

FIGS. 3B-3G are schematic side-views of a gradient low index film 300B-300G, respectively, according to different aspects of the disclosure. For clarity, the numbered elements 310-360 and the sizes $d_1$-$d_3$ described for FIG. 3A are not shown in FIGS. 3B-3G; however, each of the descriptions provided for low index optical film 300A of FIG. 3A also correspond to the gradient optical film 300B-300G of FIGS. 3B-3G, respectively. Techniques for creating the gradient optical films 300B-300G are described, for example, in co-pending U.S. Provisional Application No. 61/254,674 entitled "PROCESS FOR GRADIENT NANOVOIDED ARTICLE".

Figure 3B:
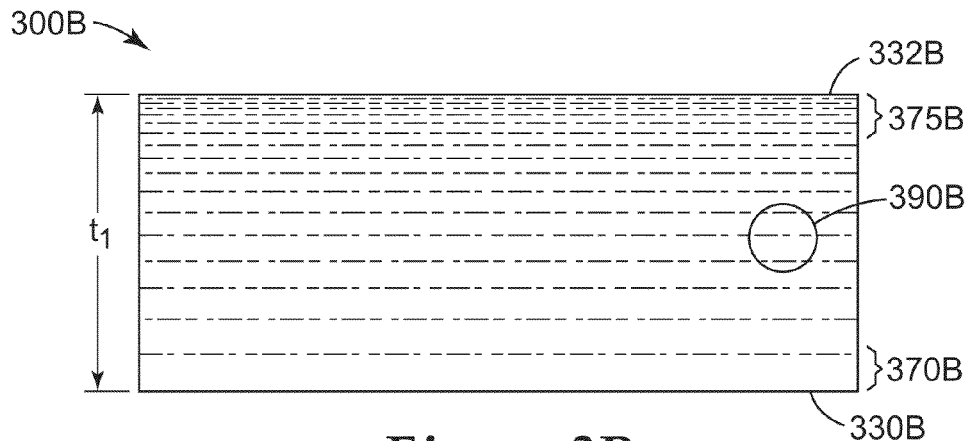
FIGS. 3B-3G are schematic side views of gradient low index optical films in accordance with embodiments of the invention.

In FIG. 3B, gradient low index optical film 300B includes a local volume fraction of interconnected voids 390B that varies along the thickness direction, for example, in a monotonic manner as shown. In one particular embodiment, a first local volume fraction of interconnected voids 370B proximate a first surface 330B of gradient low index optical film 300B is lower than a second local volume fraction of interconnected voids 375B proximate a second surface 332B of gradient low index optical film 300B.

Gradient low index optical film 300B can be prepared using a variety of techniques, as described elsewhere. In one particular embodiment, gradient low index optical film 300B can be prepared, for example, using an absorbance based technique where the intensity of polymerization light decreases from first surface 330B to second surface 332B.

Figure 3C:
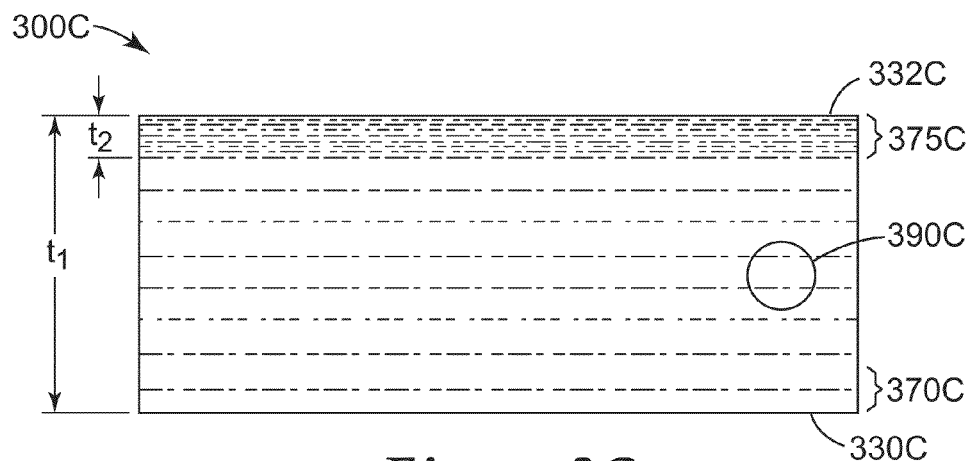

In FIG. 3C, gradient low index optical film 300C includes a local volume fraction of interconnected voids 390C that varies along the thickness direction, for example, in a step-wise manner as shown. In one particular embodiment, a first local volume fraction of interconnected voids 370C proximate a first surface 330C of gradient optical film 300C is lower than a second local volume fraction of interconnected voids 375C proximate a second surface 332C of gradient optical film 300C. In some cases, for example, shown FIG. 1C, first local volume fraction of interconnected voids 370C transitions sharply (i.e., step-wise) to second local volume fraction of interconnected voids 375C. In some cases, a thickness $t_2$ of the second volume fraction of interconnected voids 375C can be a small percentage of the total thickness $t_1$, for example, from about 1% to about 5%, or to about 10%, or to about 20%, or to about 30% or more of the total thickness $t_1$.

Gradient low index optical film 300C can be prepared using a variety of techniques, as described elsewhere. In one particular embodiment, gradient low index optical film 300C can be prepared, for example, by using a difference in the polymerization initiator concentration or a difference in the polymerization inhibitor concentration proximate the first and second surfaces (330C, 332C).

Figure 3D:

In FIG. 3D, gradient low index optical film 300D includes a local volume fraction of interconnected voids 390D that varies along the thickness direction, for example, having a minimum local volume fraction of interconnected voids 377D as shown. In one particular embodiment, a first local volume fraction of interconnected voids 370D proximate a first surface 330D of gradient optical film 300D is approximately the same as a second local volume fraction of interconnected voids 375D proximate a second surface 332D of gradient low index optical film 300D. In some cases, for example, shown FIG. 3D, first local volume fraction of interconnected voids 370D transitions sharply (i.e., step-wise) to minimum local volume fraction of interconnected voids 377D. In some cases, a thickness $t_2$ of the minimum volume fraction of interconnected voids 377D can be a small percentage of the total thickness $t_1$, for example, from about 1% to about 5%, or to about 10%, or to about 20%, or to about 30% or more of the total thickness $t_1$. In some cases, the relative position of the minimum local volume fraction of interconnected voids 377D can be located anywhere, for example, at thickness $t_3$ from first surface 330D, within gradient optical film 300D.

Gradient low index optical film 300D can be prepared using a variety of techniques, as described elsewhere. In one particular embodiment, gradient optical film 300D can be prepared, for example, by laminating a pair of the gradient optical films 300C shown in FIG. 3C to each other, along the second surfaces 332C.

Figure 3E:
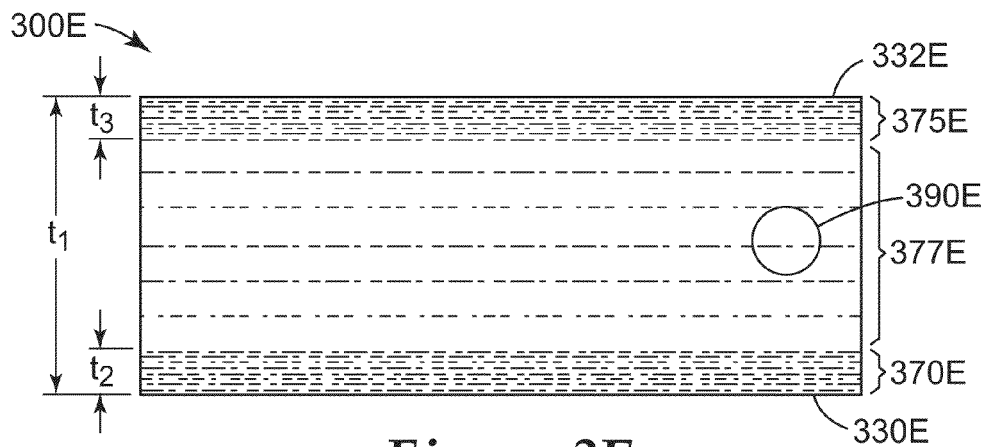

In FIG. 3E, gradient low index optical film 300E includes a local volume fraction of interconnected voids 390E that varies along the thickness direction, for example, having a step-change local volume fraction of interconnected voids proximate a first and a second surface 330E, 332E, as shown. In one particular embodiment, a first local volume fraction of interconnected voids 370E proximate a first surface 330E of gradient optical film 300E is approximately the same as a second local volume fraction of interconnected voids 375E proximate a second surface 332E of gradient optical film 300E. In some cases, for example, shown FIG. 3E, first local volume fraction of interconnected voids 370E transitions sharply (i.e., step-wise) to maximum local volume fraction of interconnected voids 377E. In some cases, a thickness $t_2$ and $t_3$ of the first and second local volume fraction of interconnected voids 370E and 375E, respectively, can be a small percentage of the total thickness $t_1$, for example, from about 1% to about 5%, or to about 10%, or to about 20%, or to about 30% or more of the total thickness $t_1$. In some cases, each of the first and second local volume fraction of interconnected voids 370E and 375E can have transitions that are not step-wise (not shown, but similar to the monotonic variation shown in FIG. 3B).

Gradient low index optical film 300E can be prepared using a variety of techniques, as described elsewhere. In one particular embodiment, gradient optical film 300E can be prepared, for example, by laminating a pair of the gradient optical films 300C shown in FIG. 3C to each other, along the first surfaces 330C.

Figure 3F:
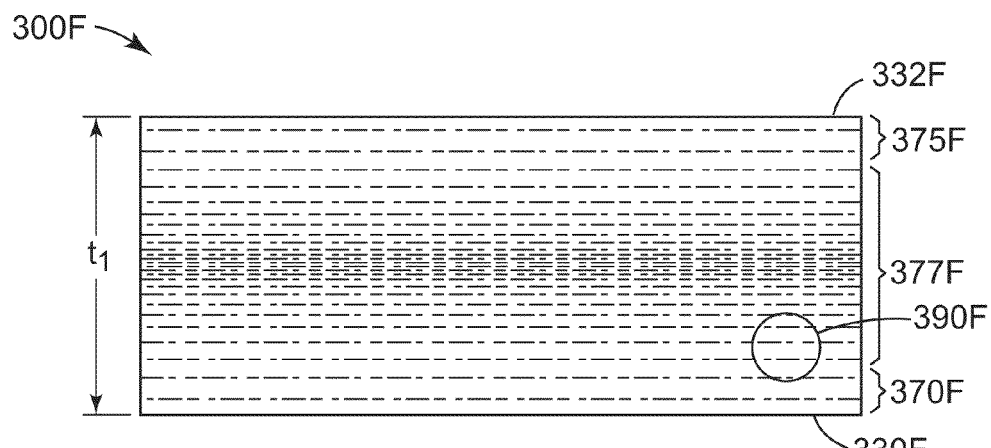

In FIG. 3F, gradient low index optical film 300F includes a local volume fraction of interconnected voids 390F that varies along the thickness direction, for example, having a gradient minimum local volume fraction of interconnected voids 377F as shown. In one particular embodiment, a first local volume fraction of interconnected voids 370F proximate a first surface 330F of gradient optical film 300F is approximately the same as a second local volume fraction of interconnected voids 375F proximate a second surface 332F of gradient optical film 300F. In some cases, for example, shown FIG. 3F, first local volume fraction of interconnected voids 370F transitions gradually (i.e., in a monotonic gradient) to a minimum local volume fraction of interconnected voids 377F, and again transitions gradually to the second volume fraction of interconnected voids 375F.

Gradient low index optical film 300F can be prepared using a variety of techniques, as described elsewhere. In one particular embodiment, gradient optical film 300F can be prepared, for example, by laminating a pair of the gradient optical films 300B shown in FIG. 3B to each other, along the second surfaces 332B.

Figure 3G:

In FIG. 3G, gradient low index optical film 300G includes a local volume fraction of interconnected voids 390G that varies along the thickness direction, for example, having a pair of step-change local volume fraction of interconnected voids 377G, 378G, as shown. In one particular embodiment, a first local volume fraction of interconnected voids 370G proximate a first surface 330G of gradient optical film 300G is approximately the same as a second local volume fraction of interconnected voids 375G proximate a second surface 332G of gradient optical film 300G. In some cases, for example, shown in FIG. 3G, first local volume fraction of interconnected voids 370G transitions sharply (i.e., step-wise) to minimum local volume fraction of interconnected voids 377G, transitions sharply again to a maximum local volume fraction of interconnected voids 380G, transitions sharply again to a minimum local volume fraction of interconnected voids 378G, and finally transitions sharply yet again to the second local volume fraction of interconnected voids 375G. In some cases, each of the local volume fraction of interconnected voids can have transitions that are not step-wise (not shown, but similar to the monotonic variation shown in FIG. 3B).

Gradient low index optical film 300G can be prepared using a variety of techniques, as described elsewhere. In one particular embodiment, gradient optical film 300G can be prepared, for example, by a multilayer coating technique, where a different photoinitiator concentration can be used in strata corresponding to minimum local void volume fraction (377G, 378G) than in strata corresponding to maximum local void volume fraction 390G.

Figure 8A:
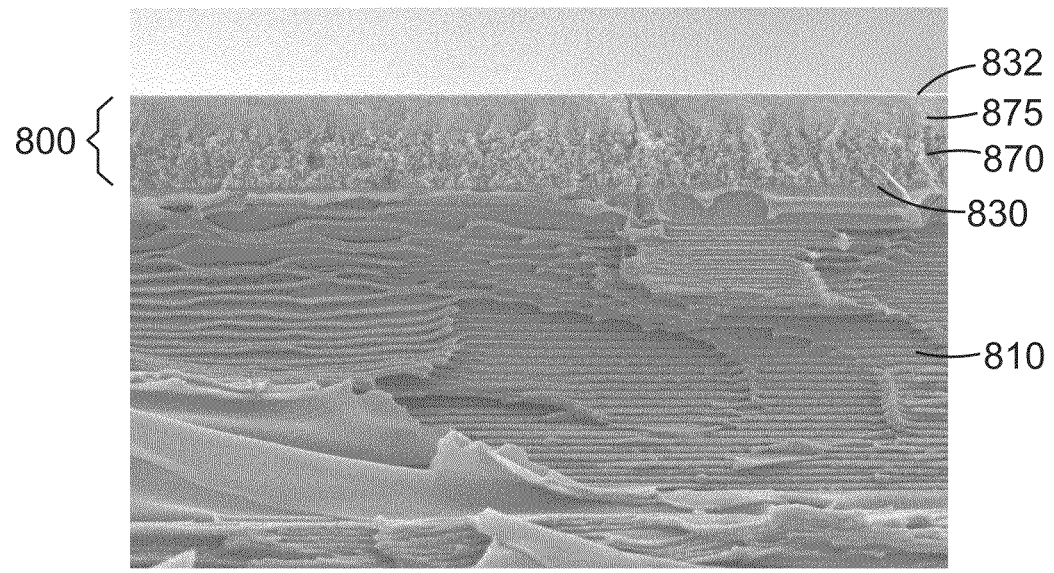
FIG. 8A is a cross-sectional micrograph of a gradient low index optical film.
Figure 8B:
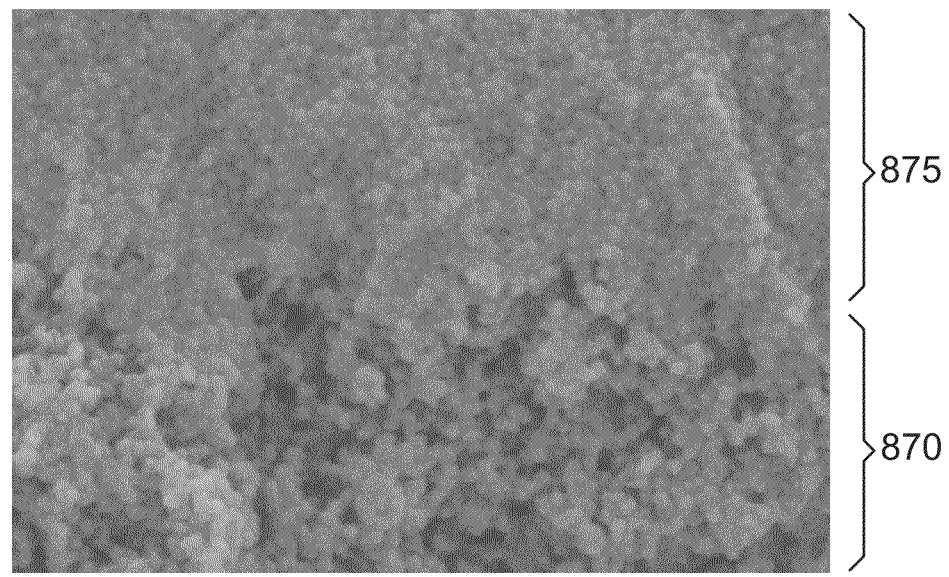
FIG. 8B is a higher magnification of the micrograph in FIG. 8A.

FIG. 8A is a cross-sectional micrograph of a gradient low index optical film 800 coated on a substrate 810, according to one aspect of the disclosure. The gradient optical film 800 includes a first major surface 830 adjacent to the substrate 810, and a first local volume fraction of interconnected voids 870 proximate the first major surface 830. The gradient optical film further includes a second major surface 832 and a densified second local volume fraction of interconnected voids 875 proximate the second major surface 832. FIG. 8B is a higher magnification of the micrograph in FIG. 8A, and more clearly shows that the first local volume fraction of interconnected voids 870 is greater than the densified second volume fraction of interconnected voids 875.

Optical constructions described herein are useful in display backlights, e.g., for LCD displays. Confining light to a zone within a backlight is an important capability in some applications. Doing so enables dynamic dimming, where the backlight is actively, locally reduced in brightness depending on display content. This has the advantage of significantly reducing display power, and can increase contrast. Additionally, field sequential systems can benefit from zoning, and with proper pixel switching speeds can enable rendition of fast motion images with reduced image blur.

Optical constructions as described herein can be arranged as elements in an array of 10 s to 100 s of light guides to create a zoned system. Each element of the array may include one or more light sources, a light guide, and one or more optical layers, e.g., a low index optical film, polarizer, and light redirecting film. In these configurations, the brightness of each element can be individually controlled. In some cases, uniformity is enhanced by nesting and/or tiling the light guides so that the LEDs and part of the light guide are positioned under an adjacent light guide. This interleaved, or sawtooth pattern replicates throughout the display. Two scenarios are shown below in FIGS. 4A and 4B. The size of the light guides used in these implementations can be small, on the order of one to several cm diagonal, or can be hundreds of cm for large wall displays where each element can be the size of a TV.

FIG. 4A illustrates nested optical constructions 410, 415. Each of the optical constructions 410, 411 includes a light guide 411, 416, light source 490, 491, and one or more optical layers 412, 417, which may include a low index film, a light redirecting film and/or a polarizer. A liquid crystal display (LCD) panel 480 is positioned above the nested optical constructions 410, 415.

As illustrated in FIG. 4A, light source 491 and a portion of light guide 416 are positioned under adjacent optical construction 410. The positioning of light source 491 and light guide 416 under an adjacent light guide 411 involves sliding the tiles together so that little or no gap exists between the tiles. There may be a shield such as a reflective strip positioned directly above the light source 490, 491 to limit any light leaked directly toward the LCD panel 480.

FIG. 4B illustrates tiled optical constructions 420, 425, 430. Each of the optical constructions 420, 425, 430 includes a light guide 421, 426, 431, light source 492, 493, 494, and one or more optical layers 422, 427, 432 which may comprise a low index film, a light redirecting film and/or a polarizer.

EXAMPLES

1. Materials Used in Preparation of the Examples and Acronyms

Prism film on 10 mil polycarbonate (denoted herein as PC-BEF)—A curable layer with a linear prismatic structured surface was coated and cured on a 10 mil polycarbonate substrate. The uncured material had an index of refractive of greater than 1.55. The linear prismatic structures had a 90° included angle, 50 micron pitch, and a tip radius of 7 microns. The prism film was made as described in U.S. Pat. No. 6,280,063 on a 10 mil polycarbonate film.

Adhesive (denoted herein in as PSA)—0.1% bisamide crosslinker was added to SK Dyne 2003K wet adhesive, available from Soken Chemicals, Tokyo, Japan, and the mixture was coated onto 2 mil polyester silicone release liner (T50 available from CP Films, St. Louis, Mo.) using a conventional slot die and the solvent was dried, leaving a 1 mil thick adhesive coating. A second release liner was laminated to the surface of the dried adhesive: 2 mil polyester silicone release liner with differential release (T10 also available from CP Films).

Reflective polarizer A (denoted herein as DBEF-Q)—DBEF-Q is a reflective polarizer (available as Vikuiti DBEF-Q from 3M Company St. Paul, Minn.). The DBEF-Q was about 93 microns thick.

Low index film on 2 mil PET (ULI)—In a 2 liter three-neck flask, equipped with a condenser and a thermometer, 960 grams of IPA-ST-UP organosilica elongated particles (available from Nissan Chemical Inc., Houston, Tex.), 19.2 grams of deionized water, and 350 grams of 1-methoxy-2-propanol were mixed under rapid stirring. The elongated particles had a diameter in a range from about 9 nm to about 15 nm and a length in a range of about 40 nm to about 100 nm. The particles were dispersed in a 15.2% wt IPA. Next, 22.8 grams of Silquest A-174 silane (available from GE Advanced Materials, Wilton, Conn.) was added to the flask. The resulting mixture was stirred for 30 minutes. The mixture was kept at 81° C. for 16 hours. Next, the solution was allowed to cool down to room temperature. Next, about 950 grams of the solvent in the solution were removed using a rotary evaporator under a 40° C. water-bath, resulting in a 42.1% wt A-174-modified elongated silica clear dispersion in 1-methoxy-2-propanol. Next, 47.5 grams of this clear dispersion, 16 grams of SR 444 (available from Sartomer Company, Exton, Pa.), 4 grams of CN2261 (available from Sartomer Company, Exton, Pa.), 30 grams of isopropyl alcohol, 30 grams of ethyl acetate, 0.6 grams of photoinitiator Irgacure 184 and 0.1 grams of photoinitiator Irgacure 819 (both available from Ciba Specialty Chemicals Company, High Point N.C.) were mixed together and stirred resulting in a homogenous coating solution with 31.3% wt solids. Next, the coating solution was coated on a 2 mil (0.051 mm) thick PET substrate using the coating method as described below. The coating solution was syringe-pumped at a rate of 6 cc/min into a 20.3 cm (8-inch) wide slot-type coating die. The slot coating die uniformly distributed a 20.3 cm wide coating onto a substrate moving at 10 ft/min (152 cm/min). Next, the coating was polymerized by passing the coated substrate through a UV-LED cure chamber that included a quartz window to allow passage of UV radiation. The UV-LED bank included a rectangular array of 352 UV-LEDs, 16 down-web by 22 cross-web (approximately covering a 20.3 cm×20.3 cm area). The UV-LEDs were placed on two water-cooled heat sinks. The LEDs (available from Cree, Inc., Durham N.C.) operated at a nominal wavelength of 395 nm, and were run at 45 Volts at 13 Amps, resulting in a UVA dose of 0.1352 joules per square cm. The UV-LED array was powered and fan-cooled by a TENMA 72-6910 (42V/10 A) power supply (available from Tenma, Springboro Ohio).

The UV-LEDs were positioned above the cure chamber quartz window at a distance of approximately 2.54 cm from the substrate. The UV-LED cure chamber was supplied with a flow of nitrogen at a flow rate of 46.7 liters/min (100 cubic feet per hour) resulting in an oxygen concentration of approximately 150 ppm in the cure chamber.

After being polymerized by the UV-LEDs, the solvent in the cured coating was removed by transporting the coating to a drying oven operating at 150° F. for 2 minutes at a web speed of 10 ft/min. Next, the dried coating was post-cured using a Fusion System Model I300P configured with an H-bulb (available from Fusion UV Systems, Gaithersburg Md.).

The UV Fusion chamber was supplied with a flow of nitrogen that resulted in an oxygen concentration of approximately 50 ppm in the chamber. The resulting optical film had a total optical transmittance of about 94.9%, an optical haze of 1.1%, a refractive index of 1.155, and a thickness of about 6 microns.

Reflective polarizer B (2×TOP)—A multilayer reflective polarizer was made according as described in PCT Patent Application WO2009/123928.

The thickness was 29 microns. A multilayer reflective polarizer was made according to WO2009/123928. The reflection band extended from 400 to 1200 nm. Two ply of this film were laminated together using PSA adhesive to result in the 2×TOP construction.

Light guide plate (LGP)—The LGP was obtained from Coretronic Company (Hsinchu, Taiwan 300, R.O.C.), model AUT1982T32. The LGP is made of poly(methyl methacrylate) with white print dots on the bottom surface, 6 mm thick, 385 mm wide, and 306 mm long.

White back reflector: (WBR)—The WBR was obtained from Viewsonic 22 inch monitor (model#: VLED221 wm), available from Viewsonic Company, Walnut, Calif., USA.

Backlight—A 22" Viewsonic monitor model # VLED221 wm was disassembled to separate the backlight from the panel. The backlight was sized approximately 473 mm wide by 306 mm long. It contained a row of 78 LEDs, with the pitch of ~6 mm, along each 473 mm edge of the backlight and a WBR lining the back wall. Only 63 LEDs on each edge were used for the examples.

Examples 1 through 4 include a multilayer reflective polarizer laminated to the LGP, where the pass-axis of the reflective polarizer is aligned with the 385 mm length. The polarized LGP is then set into the backlight on top of the WBR such that the pass axis of the multilayer reflective polarizer is parallel to the rows of LEDs.

For experimental simplicity, material availability, and ease of interpretation, the experimental examples 1-4 use constructions that include a relatively high number of layers. Experimental constructions were made that would ensure that the same low index film coating was applied in all examples, and modify the orientation of prisms when necessary. Optical constructions could be made without the PET layer and the extra adhesive layers required for the PET. Additionally, prisms could be cast directly on the MOF, eliminating the prism substrate. Low index coatings and prism can be directly coated on MOF with no need for lamination, resulting in simple and practical constructions.

In all experimental examples from 1 to 4, the MOFs were arranged such that their pass axis was parallel to the long side of the solid LGP, where light engines were installed.

Example 1 (Experiment)

An optical construction 900 (see FIG. 9A) having PC-BEF (prisms perpendicular to the direction of light propagation in the LGP), DBEF-Q, and clear low index film coating (designated ULI), with a separate white back reflector and conventional extraction features on LGP was fabricated and tested. This example shows that even with low index optical coating, the concept with prisms running perpendicular to the direction of light propagation in the LGP exhibited a hall-of-mirror effect of multiple LED images due to the fact that certain amount of light is not guided through total internal reflection (TIR) at the surface of the LGP, and the orientation of the PC-BEF did not provide an adequate second tier of TIR.

Figure 9A:
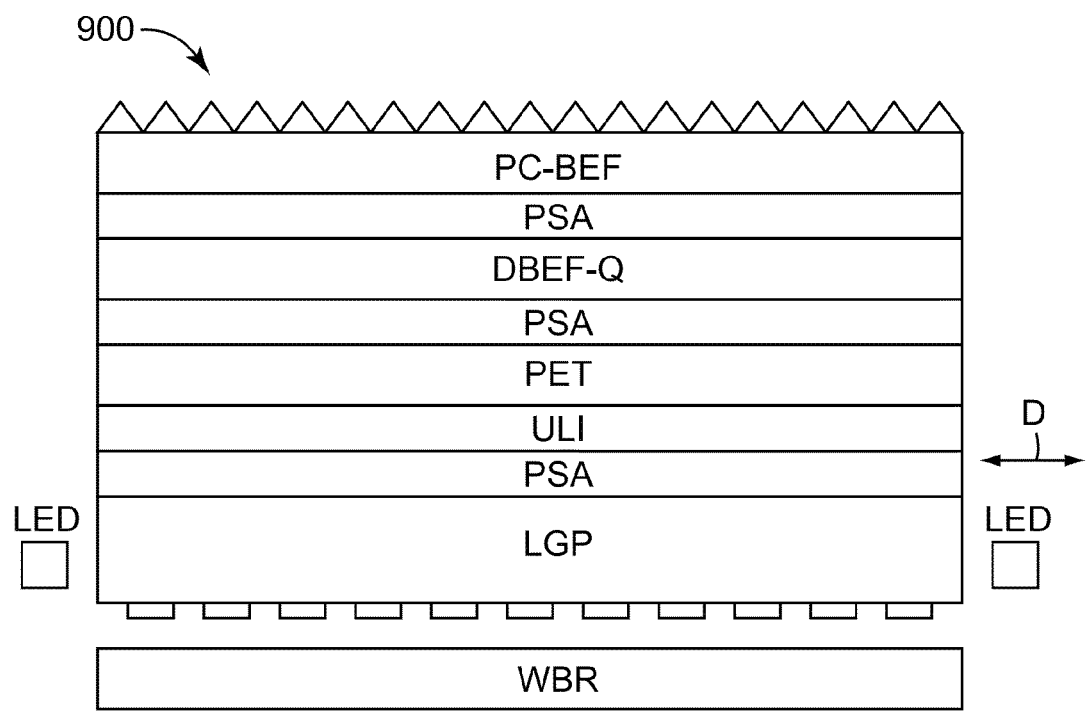
FIG. 9A is a schematic side view of the optical construction tested in Example 1.

A schematic side-view of optical construction 900 is shown FIG. 9A. The optical construction included a WBR, a LGP, LED lamps, prism film, DBEF-Q, and low-index optical coating (ULI). Sixty-three LEDs were placed near each edge of the LGP and arranged regularly along the width of the LGP (385 mm).

Figure 9B:
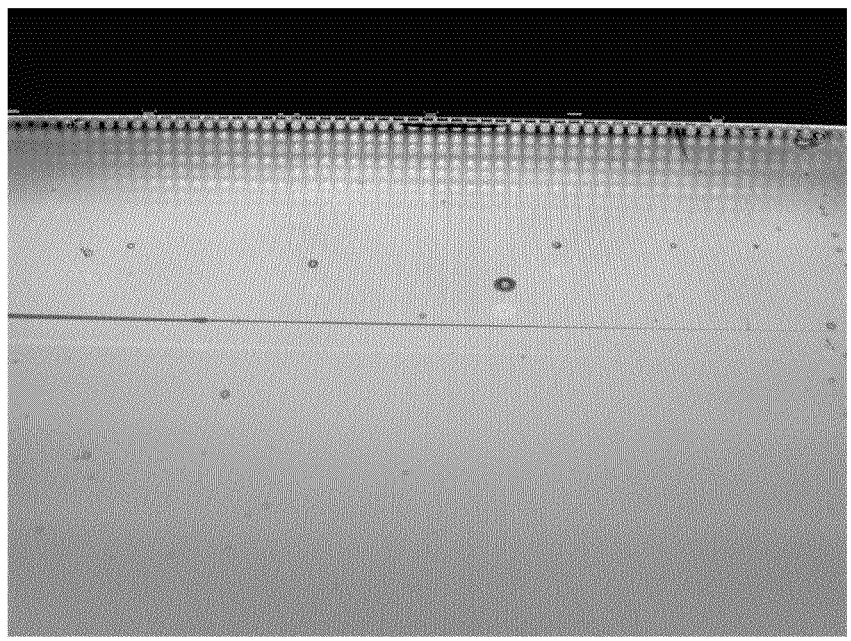
FIG. 9B is a photograph taken of an edge of the optical construction of Example 1 showing the hall of mirrors effect.

A picture of the optical construction 900 with LEDs being powered on, was taken with a digital camera (Canon S550) taken at approximately 60 degrees from normal to the surface of the optical construction. The picture is shown in FIG. 9B. The appearance of multiple images of LEDs (hall-of-mirror) results from prisms running perpendicular to the direction of light propagation in the LGP.

Example 2a (Experiment)

An optical construction 1000 (FIG. 10A) using PC-BEF (prisms oriented parallel to the direction of light propagation in the LGP), DBEF-Q, and clear low index film coating (ULI), with a separate white back reflector and conventional extraction features was fabricated and tested. The Hall of mirror (multiple images of LEDs) was substantially eliminated in this example.

Figure 10A:
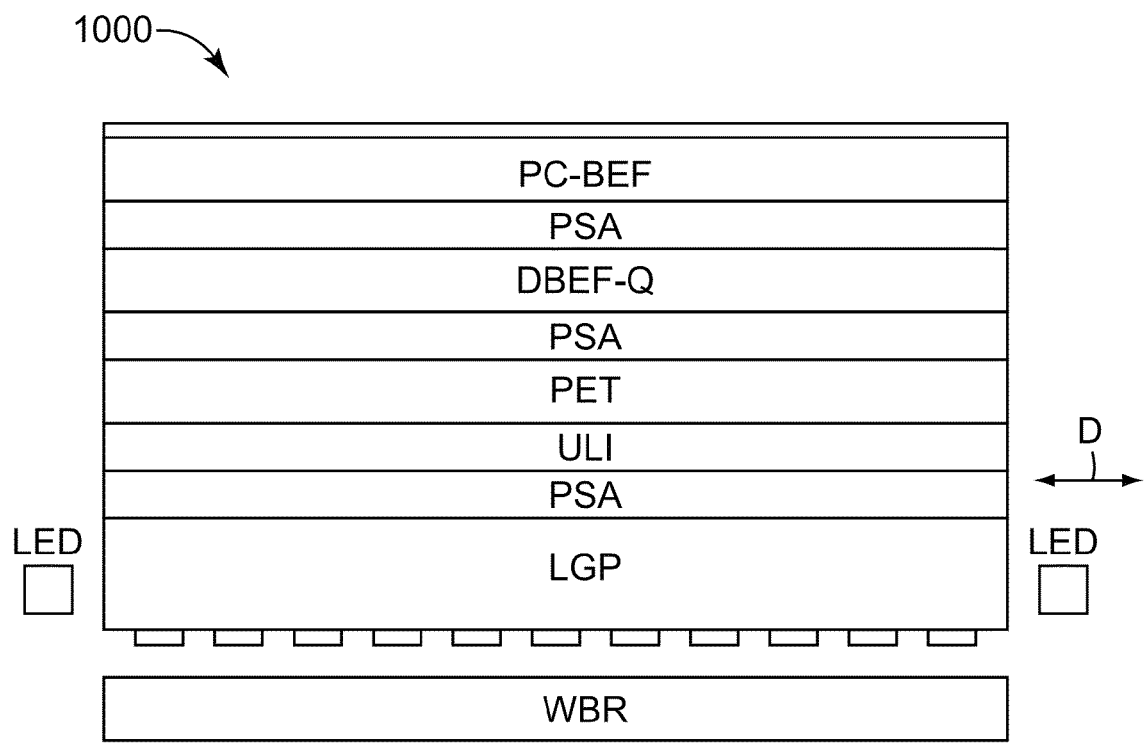

A schematic side-view of the optical construction 1000 tested in Example 2a is shown in FIG. 10A. The optical construction 1000 was similar to optical construction 900 of Example 1 except that the prisms of optical construction 1000 were running parallel to the direction of light propagation in the LGP.

Figure 10B:
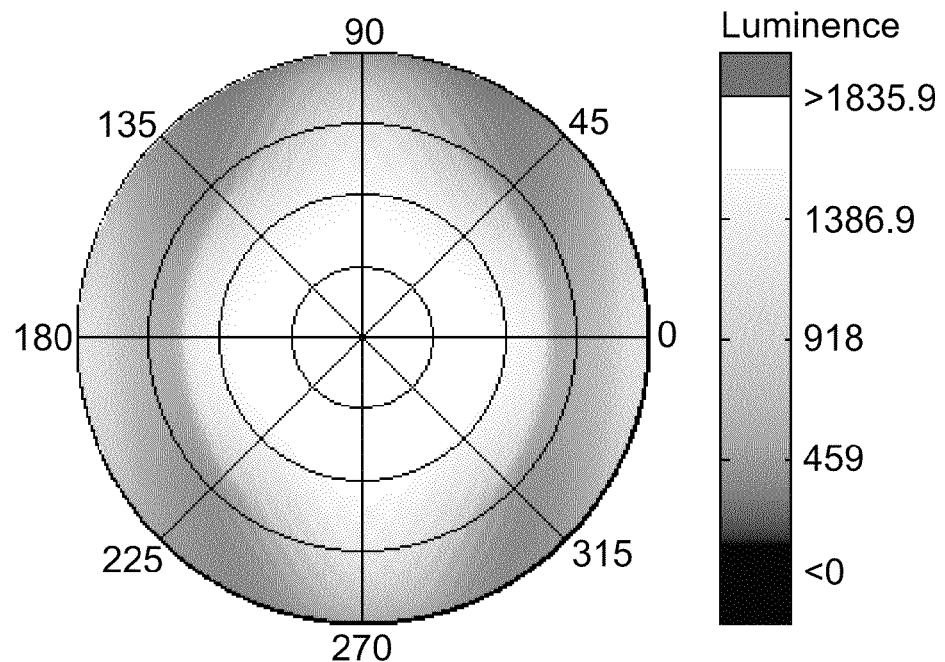
FIG. 10B is a grayscale image of the measured luminance of the optical construction of Example 2a as a function of viewing angle.
Figure 10C:
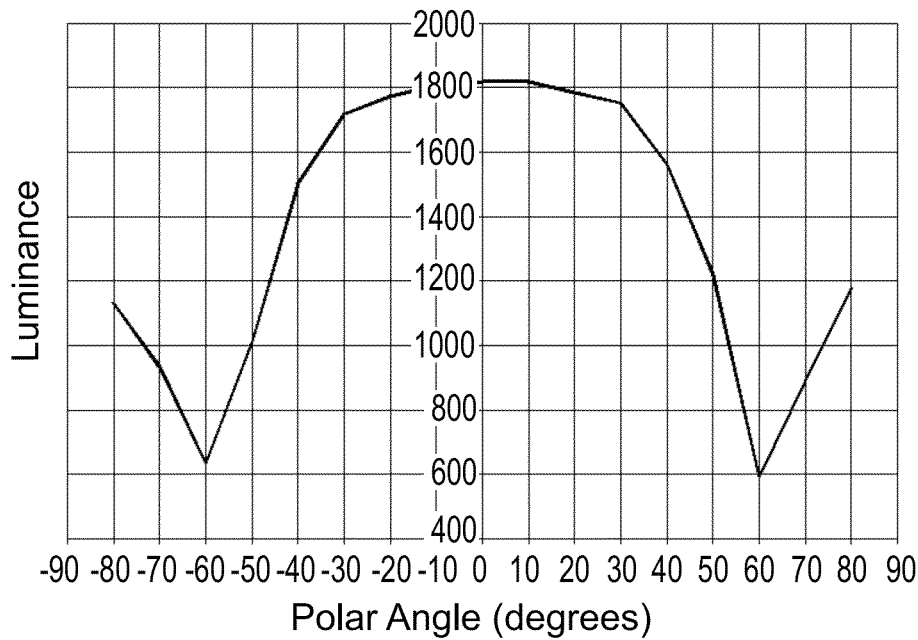
FIG. 10C is a graph of the measured luminance of the optical construction of Example 2a as a function of viewing angle along the horizontal direction.
Figure 10D:
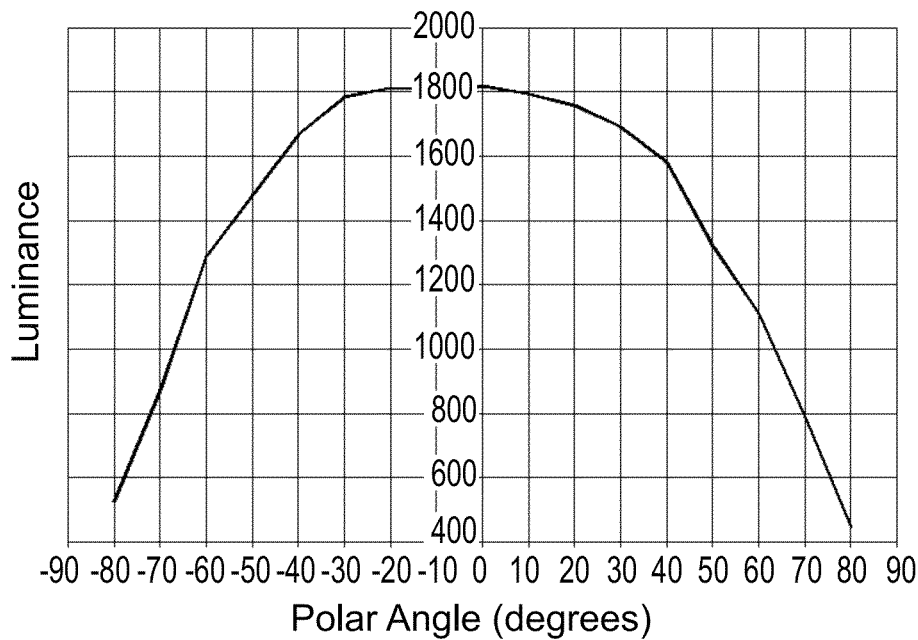
FIG. 10D is a graph of the measured luminance of the optical construction of Example 2a as a function of viewing angle along the vertical direction.

The luminance of the optical construction as a function of viewing angle was measured using an Autronic Conoscope Conostage 3 (available from Autronic-Melchers GmbH, Karlsruhe, Germany). Before making the measurements, a linear absorbing polarizer, not shown expressly in FIG. 10A, was placed on top of the optical construction with its pass-axis parallel to the long side of the LGP. FIG. 10B is a grayscale image of the measured luminance as a function of viewing angle, FIG. 10C is a graph of the measured luminance as a function of viewing angle along the horizontal direction. FIG. 10D is a graph of the measured luminance as a function of viewing angle along the vertical direction. PC-BEF was chosen as the light redirecting film because it does not significantly depolarize light.

This example demonstrated several enhancements for backlight applications: (1) substantial reduction of hall-of-mirror effect; (2) collimation of light with prism film; (3) polarized output.

Example 2b (Experiment)

An optical construction 1100 (FIG. 11A) using PC-BEF (prisms parallel to the direction of light propagation in the LGP), 2×TOP, and clear low index film coating (ULI), with a separate white back reflector (WBR) and conventional extraction features was fabricated and tested.

Figure 11A:
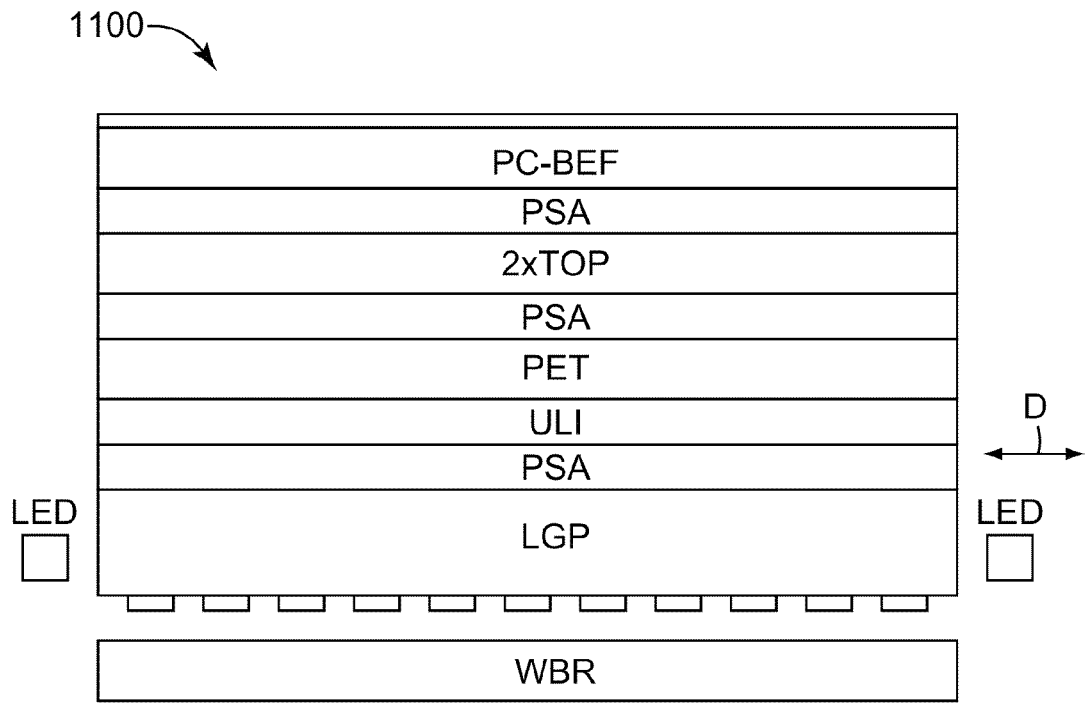
FIG. 11A is a schematic side view of the optical construction of Example 2b.
Figure 11B:
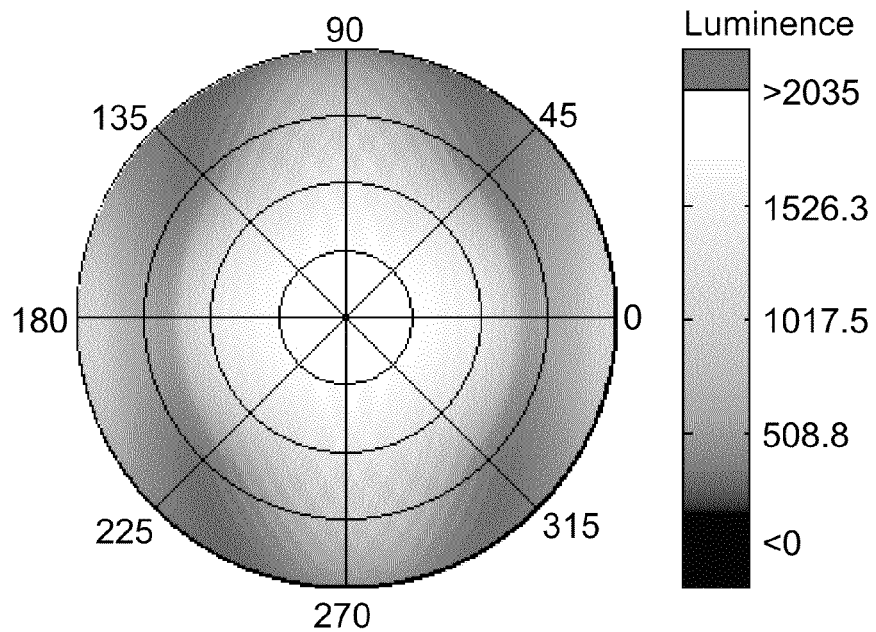
FIG. 11B is a grayscale image of the measured luminance of the optical construction of Example 2b as a function of viewing angle.
Figure 11C:
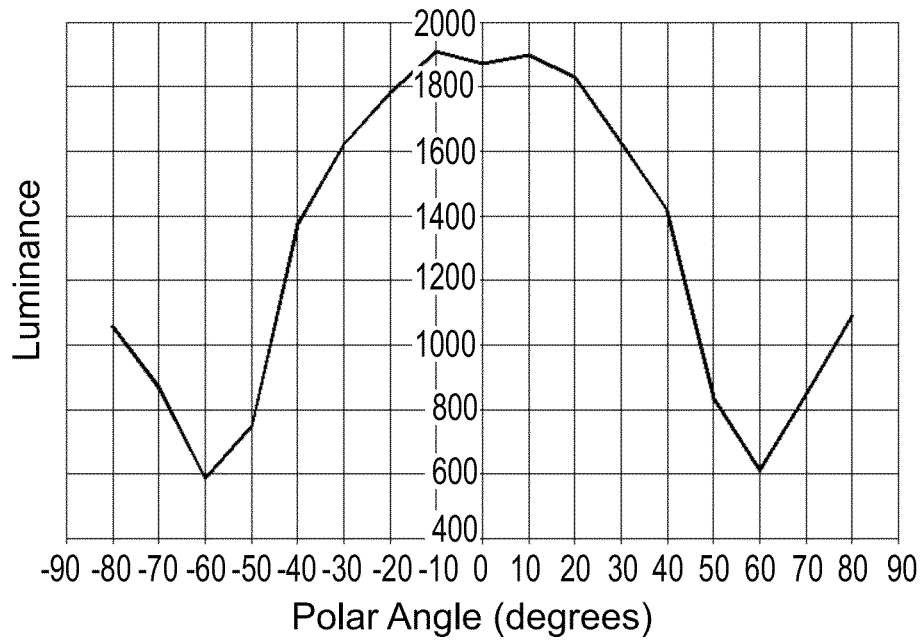
FIG. 11C is a graph of the measured luminance of the optical construction of Example 2b as a function of viewing angle along the horizontal direction.
Figure 11D:
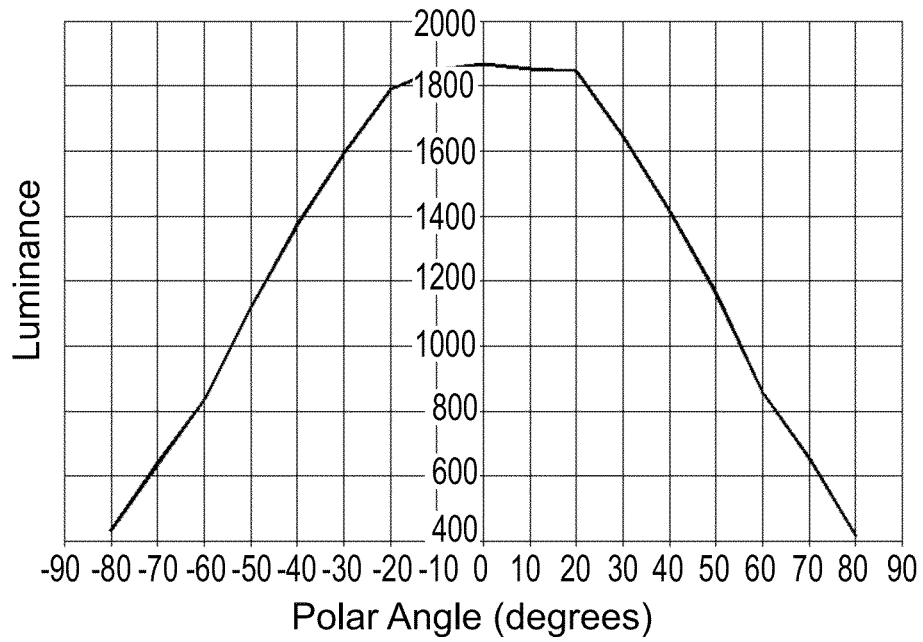
FIG. 11D is a graph of the measured luminance of the optical construction of Example 2b as a function of viewing angle along the vertical direction.

Optical construction 1100 was similar to optical construction 1000 in example 2a except that DBEF was replaced by 2×TOP. A schematic side-view of the optical construction 1100 is shown in FIG. 11A. FIG. 11B is a grayscale image of the measured luminance as a function of viewing angle, FIG. 11C is a graph of the measured luminance as a function of viewing angle along the horizontal direction. FIG. 11D is a graph of the measured luminance as a function of viewing angle along the vertical direction. Optical construction 1100 shows better collimation from collimating 2×TOP compared against DBEF-Q in optical construction 1000 (Example 2a).

Example 3 (Experiment)

An optical construction 1200 (FIG. 12A) using PC-BEF (prisms perpendicular to the direction of light propagation in the LGP), and DBEF-Q, with a separate white back reflector and conventional extraction features was fabricated and tested.

This example illustrates the optical construction 1200 with prisms running perpendicular to the direction of propagating in the LGP produces a hall-of-mirror effect (multiple LED images) caused by light that is not guided through total internal reflection in the LGP.

Figure 12A:
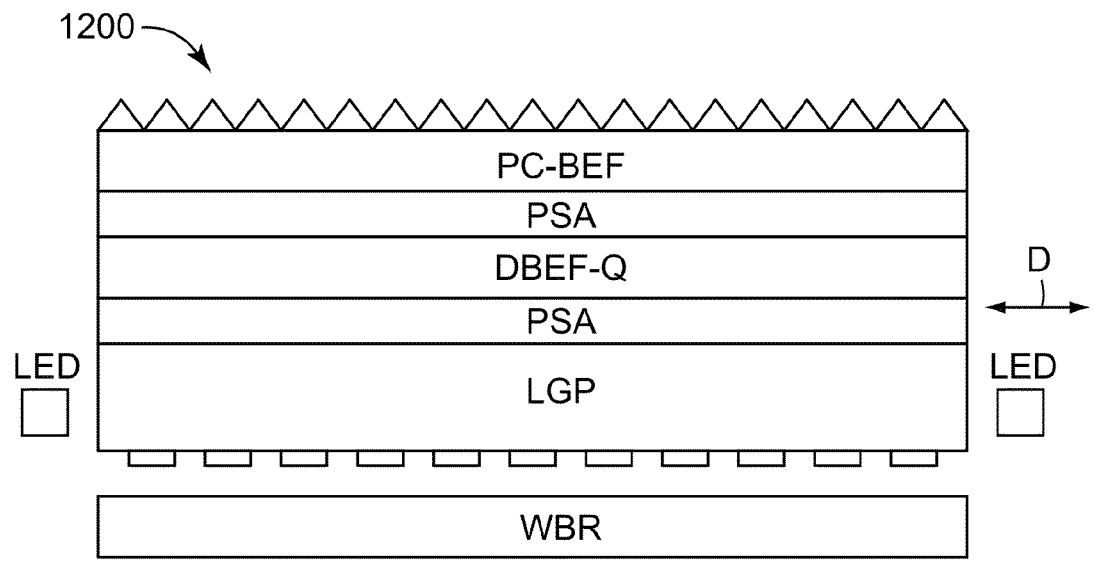
FIG. 12A is a schematic side view of the optical construction of Example 3.
Figure 12B:
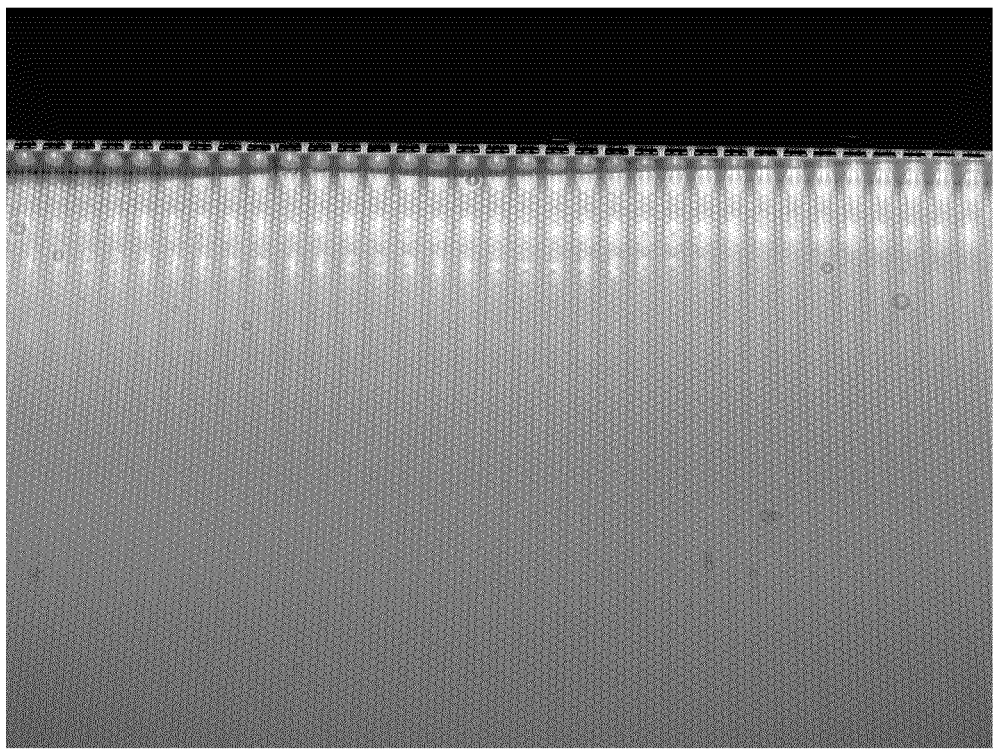
FIG. 12B is a photograph taken of an edge of the optical construction of Example 3 showing the hall of mirrors effect.

Optical construction 1200, a schematic side-view of which is shown in FIG. 12A was made. Optical construction 1200 in example 3 was similar to optical construction 900 in Example 1 except that a low index optical coating (ULI) on PET was not used. A picture of optical construction 1200 with LEDs powered on, taken with a digital camera (Canon S550) at approximately 60 degrees from surface normal, is shown in FIG. 12B illustrating multiple images of the LEDs (hall-of-mirror).

Example 4 (Experiment)

Figure 13A:
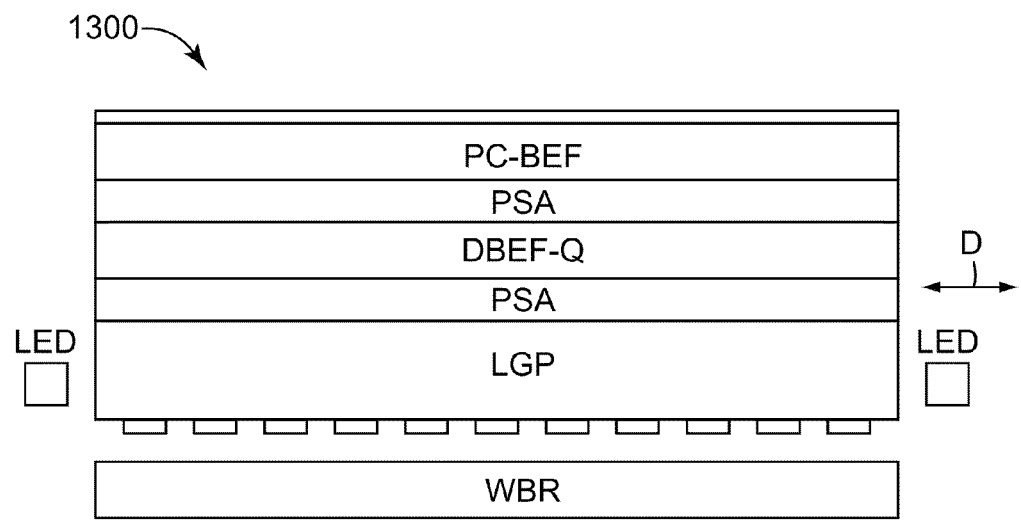
FIG. 13A is a schematic side view of the optical construction of Example 4.

An optical construction 1300 (FIG. 13A) using PC-BEF (prisms parallel to the direction of light propagation in the LGP), and DBEF-Q, with a separate white back reflector and conventional extraction features was fabricated and tested. The prism film failed to effectively collimate the light with no low index coating.

Figure 13B:
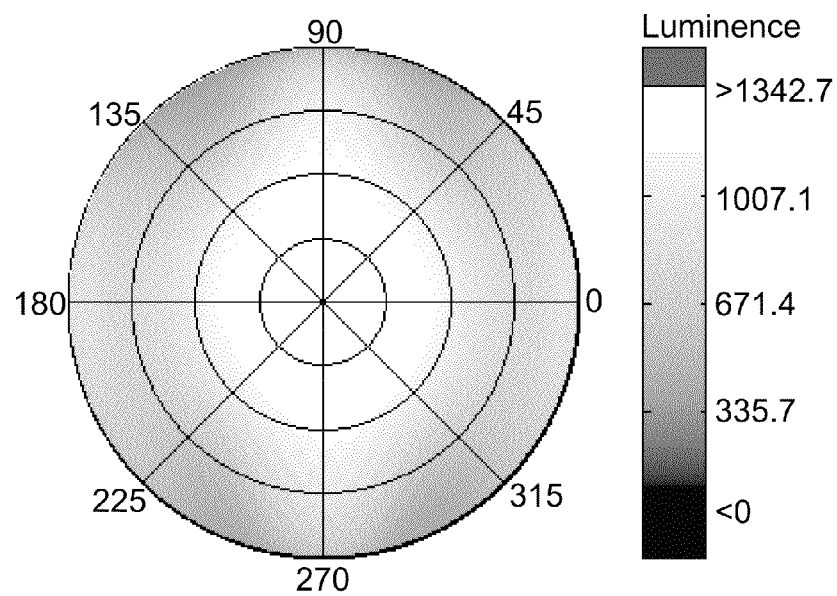
FIG. 13B is a grayscale image of the measured luminance of the optical construction of Example 4 as a function of viewing angle.
Figure 13C:
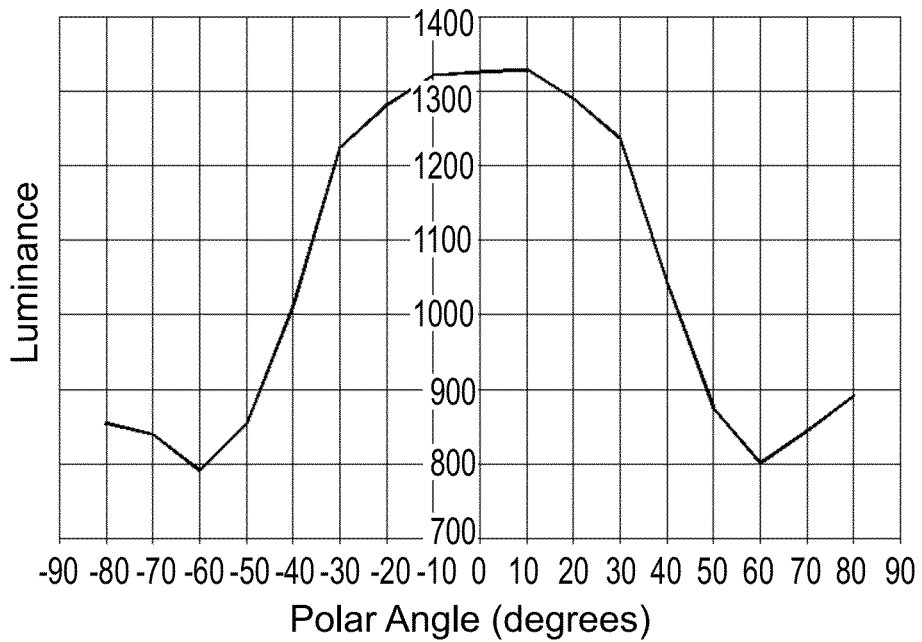
FIG. 13C is a graph of the measured luminance of the optical construction of Example 4 as a function of viewing angle along the horizontal direction.
Figure 13D:
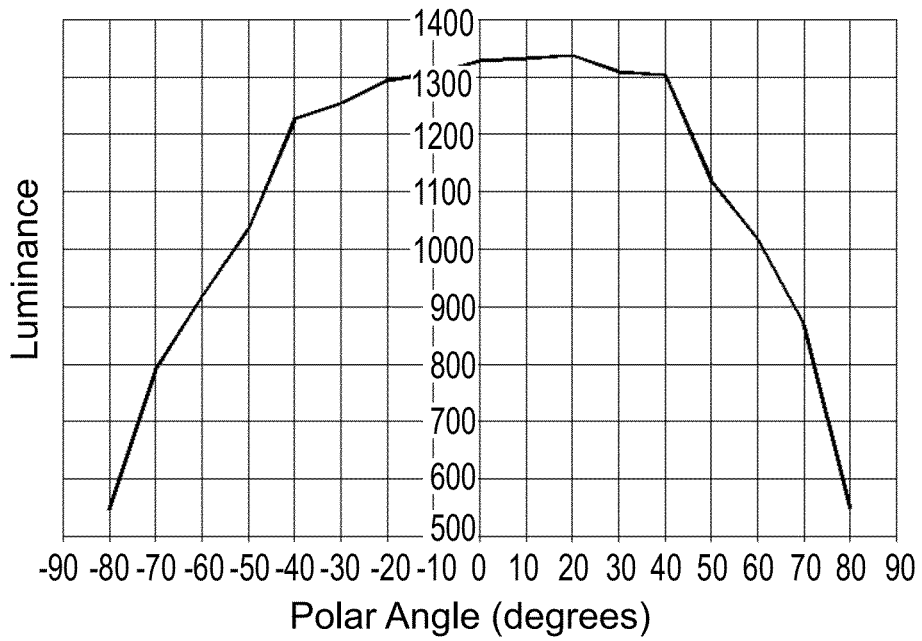
FIG. 13D is a graph of the measured luminance of the optical construction of Example 4 as a function of viewing angle along the vertical direction.

Measurements similar to those described in Example 2a were made and a grayscale image of the measured luminance as a function of viewing angle is depicted in (FIG. 13B). Cross sections along horizontal and vertical directions are shown in FIGS. 13C and 13D, respectively.

Examples 5-12 are based on simulations. Simulations 5-12 were performed using LightTools 6.0, commercially available ray-tracing software from Optical Research Associates, Calif., USA.

Example 5 (Modeling)

The simulated optical construction included a light redirecting layer oriented with prisms perpendicular to the direction of light propagation in the LGP, low index film (ULI) with a refractive index (RI) of 1.0, and an LGP without extractors.

Figure 14:
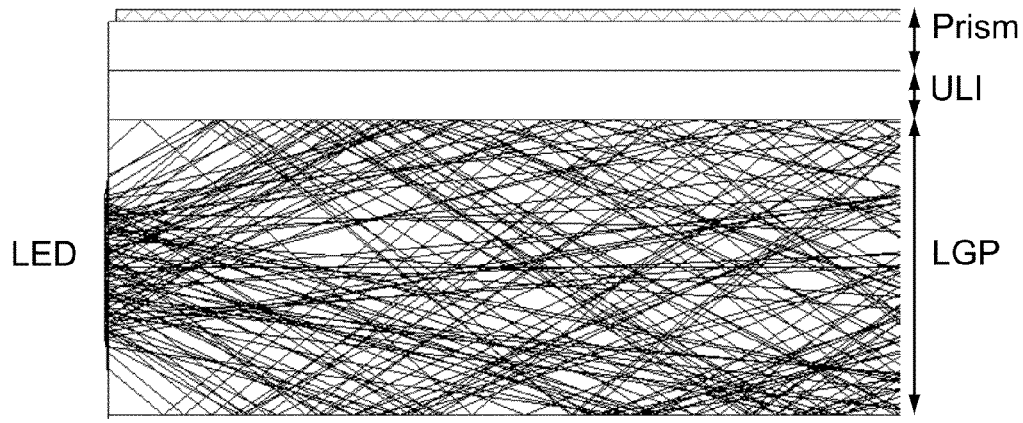
FIG. 14 shows the construction and ray tracing modeling result for Example 5.

Nine LEDs with Lambertian emission profile, height of 3 mm and width of 3 mm, pitch of mm, were placed closely to the left edge of a solid light guide plate (LGP) with the refractive index (RI) of 1.49 (PMMA). The LGP was 6 mm thick (y-direction), 90 mm wide (z-direction), and 300 mm long (x-direction.) A prism film with RI of 1.567 and 90° included angle was attached to the top surface of the LGP with low index coating in between. The prisms were oriented perpendicular to the direction of light propagation in the LGP. FIG. 14 shows the construction and ray tracing modeling result for Example 5. A total of 100 rays were emitted from the LEDs in this modeling. With the low index film RI of 1.0, corresponding to air, all light emitted by the LEDs and entering the LGP from the left edge is guided between the LGP bottom and LGP/low index interface by total internal reflection (TIR).

Example 6 (Modeling)

The simulated optical construction included a light redirecting layer oriented with prisms perpendicular to the direction of light propagation in the LGP, low index film (ULI) with a refractive index (RI) of 1.109, and LGP without extractors.

Figure 15:
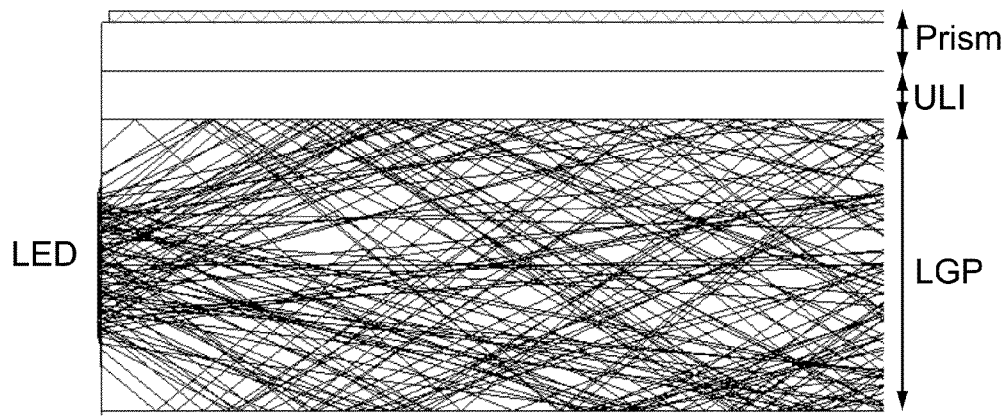
FIG. 15 shows the construction and ray tracing modeling result for Example 6.

With the same construction as Example 5 except that the low index film RI is increased to 1.109, all light emitted by the LEDs and entering the LGP from the left edge is guided between the LGP bottom and LGP/low index interface by TIR. According to simulations, a low index film RI above 1.109 caused light to leak through LGP/low index film interface. FIG. 15 shows the construction and ray tracing modeling result for Example 6.

Example 7 (Modeling)

The simulated optical construction included a light redirecting layer oriented with prisms perpendicular to the direction of light propagation in the LGP, low index film (ULI) refractive index (RI) of 1.20, and an LGP w/o extractors.

Figure 16:
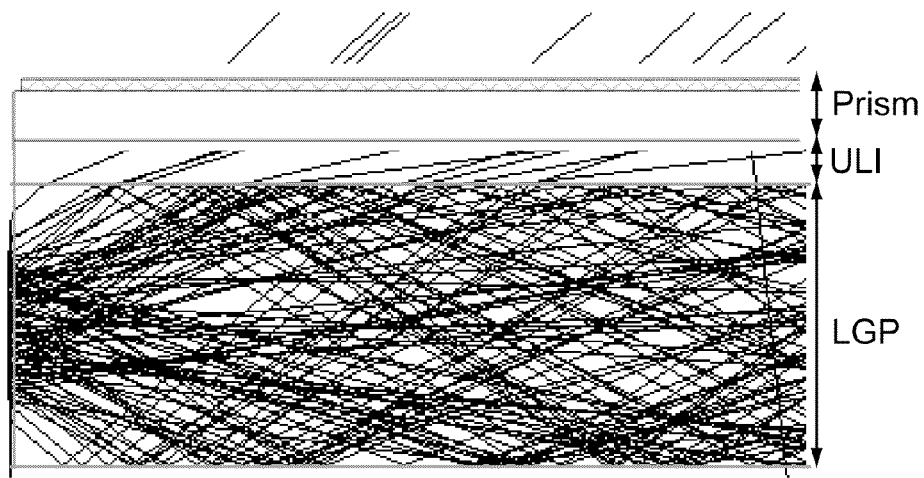
FIG. 16 shows the construction and ray tracing modeling result for Example 7.

With the same construction as Example 5 except that the low index film RI is increased to 1.2, most of light emitted by the LEDs and entering the LGP from the left edge is guided between the LGP bottom and LGP/low index film interface by TIR; about 5% of light leaks through LGP/low index film interface and not TIR guided, as shown in FIG. 16, which is the cause of hall-of-mirror (multiple images of LEDs). FIG. 16 shows the construction and ray tracing modeling result for Example 7.

Example 8 (Modeling)

The simulated optical construction included light redirecting film oriented with prisms parallel to the direction of light propagation in the LGP, a low index film (ULI) refractive index (RI) of 1.0, and an LGP without extractors.

Figure 17:
FIG. 17 shows the construction and ray tracing modeling result for Example 8.

With the same construction as Example 5 except that the light redirecting film was oriented with prisms running parallel to the direction of propagation of light in the LGP, all light emitted by the LEDs and entering the LGP from the left edge is guided between the LGP bottom and LGP/low index film interface by TIR. FIG. 17 shows the optical construction and ray tracing modeling result for Example 8.

Example 9 (Modeling)

The simulated optical construction included a light redirecting film oriented with prisms parallel to the direction of light propagation in the light guide, a low index film (ULI) refractive index (RI) of 1.109, and an LGP w/o extractors.

Figure 18:
FIG. 18 shows the construction and ray tracing modeling result for Example 9.

With the same construction as Example 8 except that the low index film RI is increased to 1.109, all light emitted by the LEDs and entering the LGP from the left edge is guided between the LGP bottom and LGP/low index film interface by TIR. Modeling indicates that a low index film RI of 1.109 is a value above which light would start leaking through LGP/low index film interface. FIG. 18 shows the construction and ray tracing modeling result for Example 9.

Example 10 (Modeling)

The simulated optical construction included a light redirecting film oriented with prisms parallel to the direction of light propagation in the LGP, a low index film (ULI) refractive index (RI) of 1.20, and an LGP w/o extractors.

Figure 19:
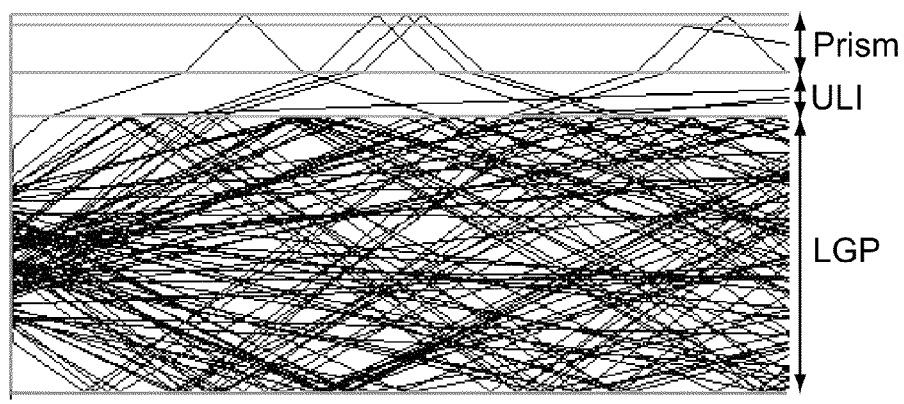
FIG. 19 shows the construction and ray tracing modeling result for Example 10.

With the same construction as Example 8 except that the low index film RI is increased to 1.2, most of light emitted by the LEDs and entering the LGP from the left edge is guided between the LGP bottom and LGP/low index interface by TIR; about 5% of light leaks through LGP/low index film interface and be reflected back again by the top surface of the light redirecting film with TIR, as shown in FIG. 19.

Example 11 (Modeling)

The low index film refractive index (ULI RI) vs. light transport with and without the light redirecting prism film was determined and a family of curves for different LGP refractive indices. Simulations were used to predict the impact of low index film RI and LGP RI on light transport in the optical constructions.

An optical construction similar to that of Example 5 was modeled except that the light redirecting prism film was removed. Low index film RI was varied from 1.0 (air) to 1.5; LGP RI was varied from 1.49 (PMMA) to 1.60 (Polycarbonate). The amount of light guided between LGP/low index film interface and LGP bottom was plotted in FIG. 20A.

Figure 20A:
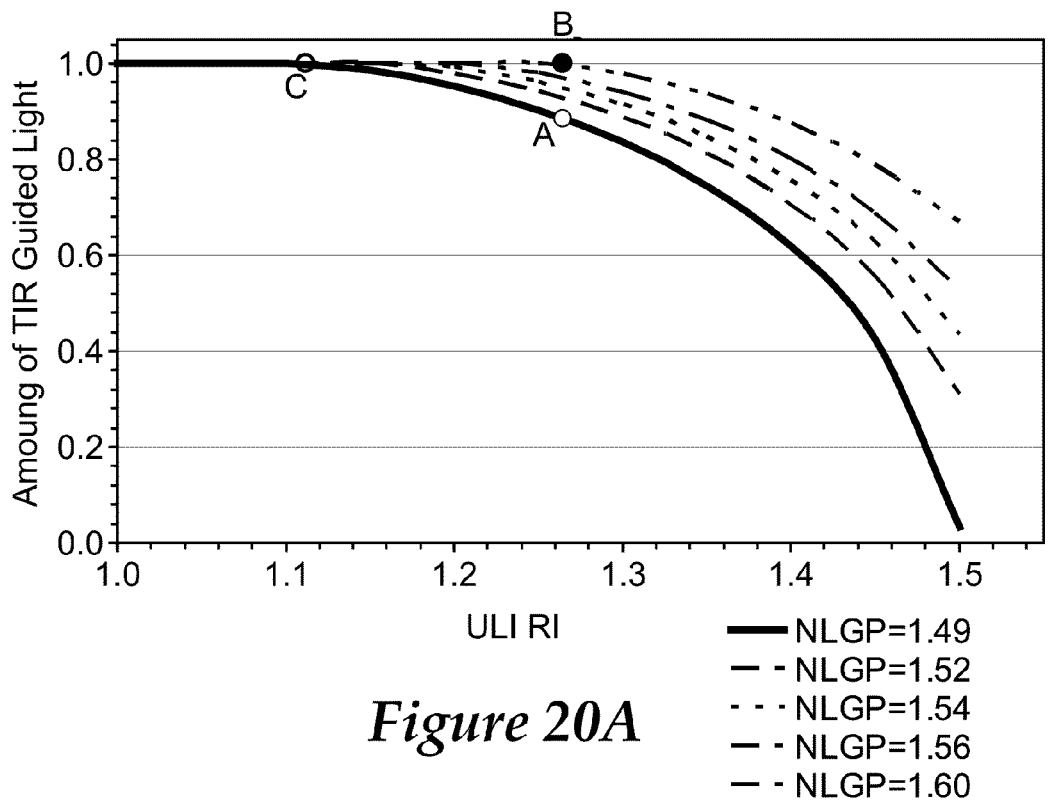
FIG. 20A is a graph of the amount of light guided in an optical construction with a low index film but without a light redirecting layer.

Three points, A, B, and C, are shown indicated FIG. 20A. If the LGP is made of PMMA with RI of 1.49 and combined with a low index film having an RI of 1.25, then approximately 90% of total light is TIR guided and the other 10% is not, as shown by point A. If the LGP is made of Polycarbonate with an RI of 1.60, then 100% of light can be TIR guided even with a low index film having an RI of 1.25, as shown by point B. For an LGP made of PMMA (RI 1.49), the low index film RI has to be as low as 1.10 in order for all light to be TIR guided, as shown by point C.

Figure 20B:
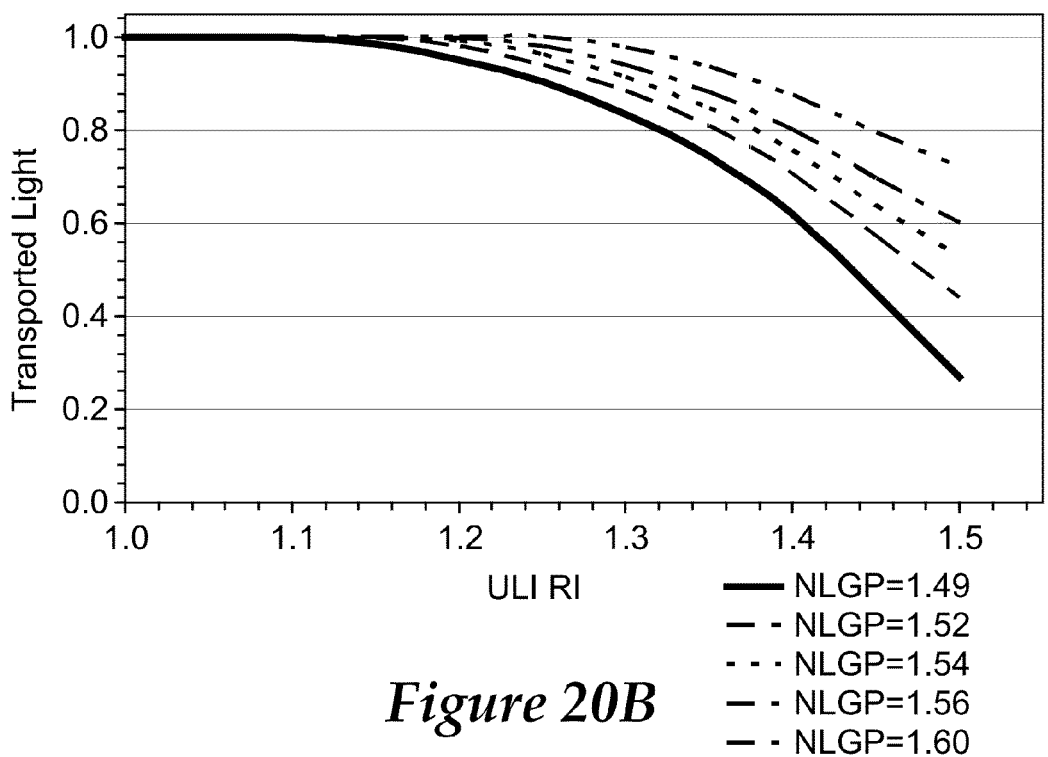
FIG. 20B is a graph of the amount of light guided in an optical construction that has a low index film and a light redirecting layer oriented with prisms perpendicular to the direction of light propagation.

An optical construction similar to Example 5 (including the light redirecting film) was modeled. The low index film refractive index (ULI RI) was varied from 1.0 (air) to 1.5. The LGP RI was varied from 1.49 (PMMA) to 1.6 (Polycarbonate). The amount of light guided between the top surface of the light redirecting film and the LGP bottom was plotted in FIG. 20B. Compared with the results of FIG. 20A, this example shows that light redirecting films having prisms that run perpendicular to the direction of light propagation in the LGP has little effect on the amount of TIR guided light.

Figure 20C:
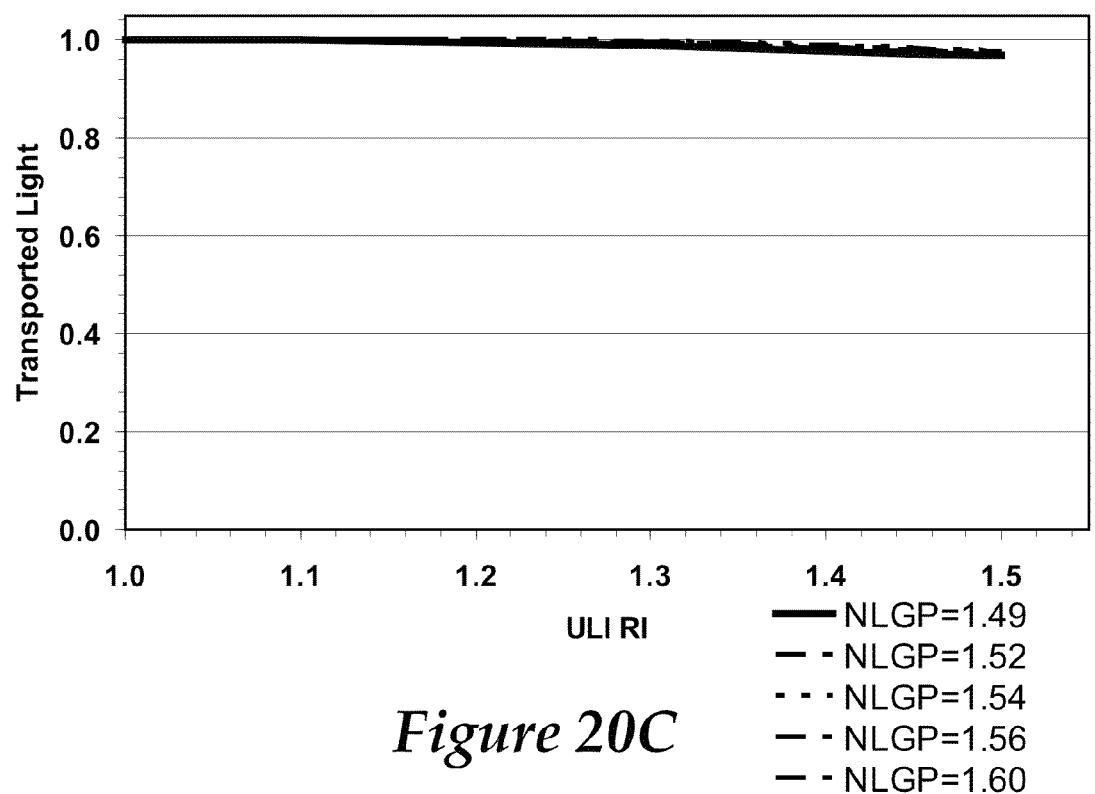
FIG. 20C is a graph of the amount of light guided in an optical construction that has a low index film and a light redirecting layer oriented with prisms parallel to the direction of light propagation.

An optical construction similar to Example 8 was modeled. The low index film refractive index (ULI RI) was varied from 1.0 (air) to 1.5; the LGP RI was varied from 1.49 (PMMA) to 1.60 (Polycarbonate). The amount of light guided between top surface of prism and LGP bottom was plotted in FIG. 20C. This example shows that with a light redirecting film having prisms running parallel to the direction of light propagation in the LGP, most light can be TIR guided, relatively independent of low index film RI and LGP RI. However, the proportion of light guided at the LGP/low index film interface vs. the prism/air interface depends on LGP RI and low index film RI, as shown in FIG. 19A.

Example 12 (Modeling)

The low index optical layer between low absorption region (LGP) and high absorption region (top films) reduces exposure of most of the light to the higher absorption layer. MOFs generally have higher absorption than an LGP; therefore it is desirable to reduce the exposure of the light to the MOF until the light is extracted, which causes the light to take a short traverse through the MOF at an angle close to surface normal, maximizes system efficiency. This example demonstrates how much low index film RI can affect system efficiency when a high absorption region is attached to a LGP.

Figure 21A:
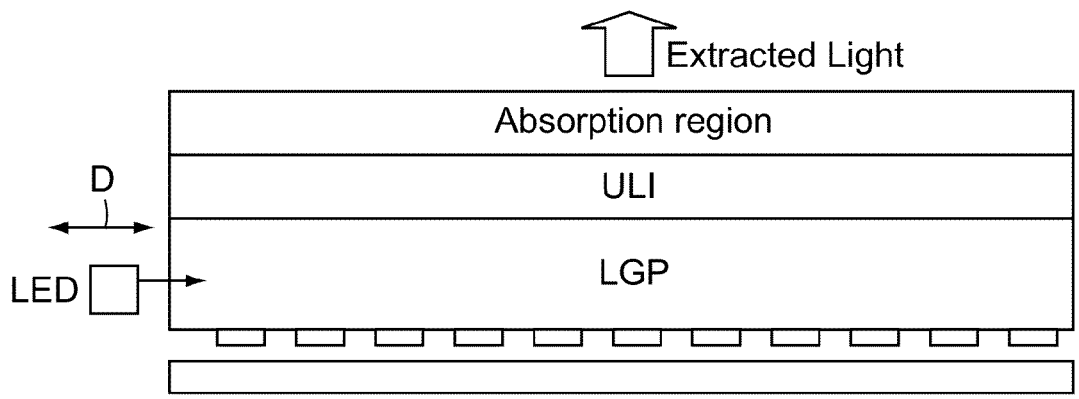
FIG. 21A is a schematic side view of the optical construction tested in Example 12.
Figure 21B:
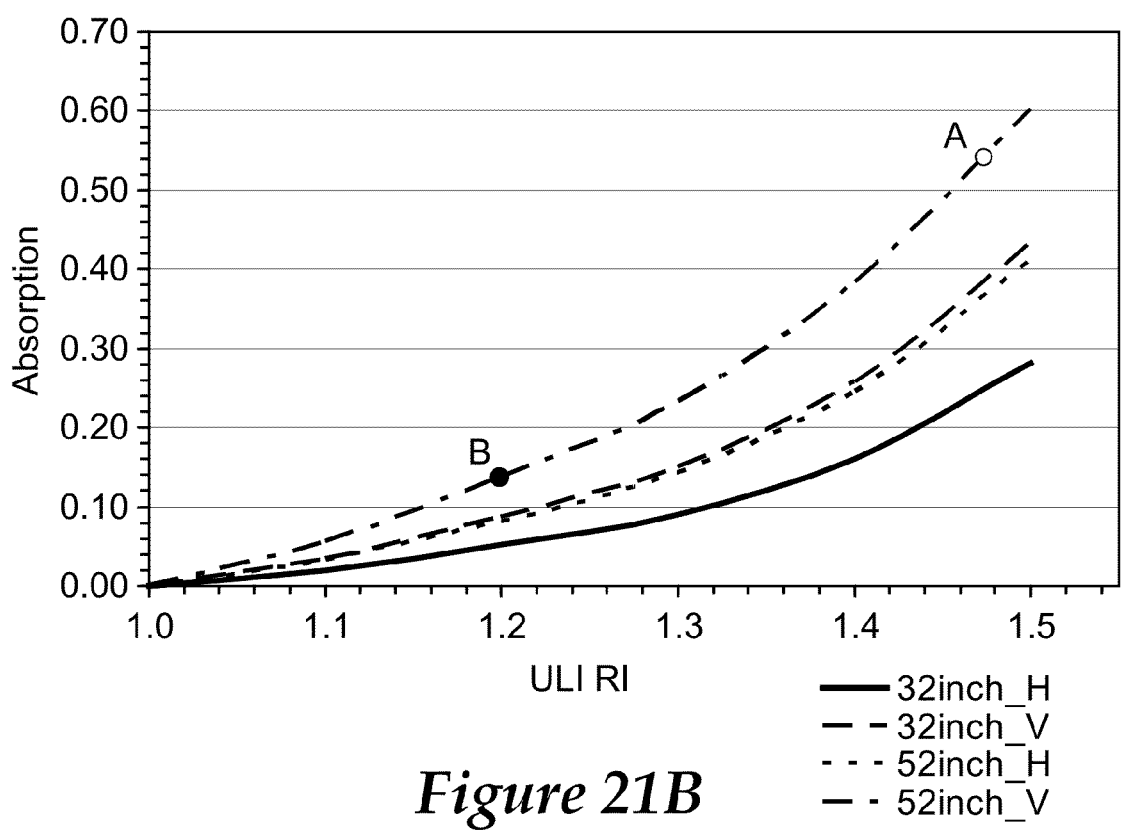
FIG. 21B is a graph showing the amount of light being absorbed by the high absorption region for 32" and 52" backlights plotted against the refractive index of the low index layer.

The simulated structure is shown in FIG. 21A. LEDs with Lambertian emission profile and height of 3 mm were placed closely to the illuminated edge of a LGP with the RI of 1.49. The LGP was 6 mm thick, 90 mm wide, and 300 mm long (from illuminated edge to the distal edge). An absorption region, used to simulating optical films such as DBEF-Q, was placed above the LGP with a low index film (ULI) in between. The absorption region was 0.05 mm thick, with the transmission of 95% per mm, and evenly splits the incident light (50% reflection and 50% transmission.) Circular dots with the diameter of 0.75 mm and lambertian reflectance of 100% were placed on the bottom surface of LGP for light extraction. Bezier placement, provided by LightTools 6.0, was used to vary the dots density in order to achieve reasonable spatial uniformity. The front and back edges of the LGP were set as perfect mirrors. A white back reflector was placed under the LGP; the reflector has lambertian reflectance of 100%. Extraction efficiency and absorption by the high absorption region were first calculated using the 300 mm long LGP and then scaled up for 32" (16"×27.7") and 52" diagonal (26"×45") backlights. The amount of light being absorbed by the high absorption region for 32" and 52" backlights was plotted against the low index RI in FIG. 21B. For each size, two scenarios with light injected from long edge or short edge were both calculated and plotted. For a 52" TV with LEDs arranged on the short edges (typically left and right edge), the absorption by the high absorption region would be 55% if an optical layer with an RI of 1.47 were used, as shown by point A. The absorption would be only 14% if a low index layer with RI of 1.2 were used, as shown by point B.

Item 1 is an optical construction, comprising:
a light guide having first surface and a second surface comprising a major light exit surface of the light guide;
a light redirecting film; and
a low index layer disposed between the light guide and the light redirecting film, the low index layer having an index of refraction not greater than 1.35, the low index layer attached to the second surface of the light guide and to the light redirecting film.

Item 2 is the optical construction of item 1, wherein the first surface of the low index layer is attached to the major light exit surface of the light guide by an adhesive layer.

Item 3 is the optical construction of item 1, wherein the first surface of low index layer is attached to the major light exit surface of the light guide by formation of the low index layer on the major light exit surface of the light guide.

Item 4 is the optical construction of item 1, wherein the low index layer is attached to the major light exit surface of the light guide through one or more intervening layers disposed between the low index layer and the light guide.

Item 5 is the optical construction of item 1, wherein the low index layer is attached to the light redirecting film by an adhesive layer.

Item 6 is the optical construction of item 1, wherein the low index layer is attached to the light redirecting film by formation of the low index layer on the light redirecting film.

Item 7 is the optical construction of item 1, wherein the low index layer is attached to the light redirecting film through one or more intervening layers disposed between the low index layer and the light guide.

Item 8 is the optical construction of item 7, wherein the one or more intervening layers comprises a high absorption layer.

Item 9 is the optical construction of item 7, wherein the one or more intervening layers comprises a polarizer.

Item 10 is the optical construction of item 7, wherein the one or more intervening layers comprises a diffuser.

Item 11 is the optical construction of item 10, wherein the diffuser comprises a plurality of voids.

Item 12 is the optical construction of item 1, wherein the light redirecting film comprises a first surface and a second surface having structured features.

Item 13 is the optical construction of item 12, wherein the second surface of the light redirecting film is oriented away from the light guide.

Item 14 is the optical construction of item 12, wherein the second surface of the light redirecting film is oriented toward the light guide.

Item 15 is the optical construction of item 1, wherein:
the light guide has an absorption A1; and
the light redirecting film has an absorption greater than A1.

Item 16 is the optical construction of item 1, further comprising a high absorption layer disposed between the low index layer and the light redirecting film, the high absorption layer having an absorption greater than an absorption of the light guide.

Item 17 is the optical construction of item 1, wherein the light redirecting film has an absorption greater than an absorption of the light guide.

Item 18 is the optical construction of item 1, wherein the low index layer is repositionable.

Item 19 is an optical construction, comprising:
a low index layer having an index of refraction, Nuli, where Nuli is not greater than about 1.35;
a high absorption layer; and
a light redirecting film, wherein substantial portions of each of two neighboring films in the optical construction are in physical contact with each other.

Item 20 is the optical construction of item 19, wherein the low index layer has an index of refraction that is not greater than about 1.2.

Item 21 is the optical construction of item 19, wherein the low index layer has an index of refraction that is not greater than about 1.1.

Item 22 is the optical construction of item 19, wherein the low index layer has a haze that is less than about 5%.

Item 23 is the optical construction of item 19, wherein the high absorption layer comprises a multilayer optical film.

Item 24 is the optical construction of item 19, wherein the thickness of the low index layer is not less than about 2 microns.

Item 25 is the optical construction of item 19, wherein the thickness of the low index layer is not less than about 1 micron.

Item 26 is the optical construction of item 19, wherein the low index layer comprises a plurality of voids.

Item 27 is the optical construction of item 26, wherein the voids are interconnected.

Item 28 is the optical construction of item 26, wherein a volume fraction of the plurality of voids is not less than about 20%.

Item 29 is the optical construction of item 26, wherein a volume fraction of the plurality of voids is not less than about 40%.

Item 30 is the optical construction of item 26, wherein a local volume fraction of the plurality of voids varies along a thickness direction of the low index layer.

Item 31 is the optical construction of item 26, wherein a first local volume fraction of the plurality of voids at a first surface of the low index layer is greater than a second local volume fraction of the plurality of voids at a second surface of the low index layer.

Item 32 is the optical construction of item 26, wherein the low index layer further comprises:
a binder; and
a plurality of particles wherein a weight ratio of the binder to the plurality of voids is not less than about 1:2.

Item 33 is the optical construction of item 32, wherein the plurality of particles has an average size of less than about 100 nm.

Item 34 is the optical construction of item 19, wherein more than 50% of each of two neighboring films in the optical construction are in physical contact with each other.

Item 35 is the optical construction of item 19, wherein the high absorption layer comprises a reflective polarizer.

Item 36 is an optical construction, comprising:
at least one light guide having a first surface, a second surface, and an index of refraction N1, the second surface being a major light exit surface of the light guide;
a low index layer having an index of refraction, Nuli, where Nuli is less than N1; and
a light redirecting film, wherein substantial portions of each of two neighboring films in the optical construction are in physical contact with each other.

Item 37 is the optical construction of item 36, wherein the low index layer increases optical confinement of the light propagated in the light guide.

Item 38 is the optical construction of item 36, further comprising a high absorption layer between the low index layer and the light redirecting film, wherein the high absorption layer has an absorption that is about twice an absorption of the light guide.

Item 39 is the optical construction of item 38, wherein:
the light guide includes light extraction features; and
the low index layer is configured to reduce the amount of light entering the high absorption layer until the light is extracted by a light extraction feature in comparison to an optical construction without the low index layer.

Item 40 is the optical construction of item 38, wherein the high absorption layer comprises a reflective polarizer.

Item 41 is the optical construction of item 36, wherein the light redirecting film comprises a first surface and a second surface, the second surface of the light directing film having refractive structures disposed thereon, wherein the second surface of the light redirecting film is disposed away from the light guide.

Item 42 is the optical construction of item 36, wherein the light redirecting film comprises a first surface and a second surface, the second surface of the light directing film having refractive structures disposed thereon, wherein the second surface of the light redirecting film is disposed toward the light guide, the low index layer at least partially fills spaces between the refractive structures.

Item 43 is the optical construction of item 36, wherein the low index layer is attached to the major exit surface of the light guide with an adhesive.

Item 44 is the optical construction of item 36, wherein the light guide includes extraction features on the first surface of the light guide.

Item 45 is the optical construction of item 36, wherein:
the light guide transports light along a light transport axis; and
the light redirecting film comprises refractive structures which are oriented substantially parallel to the light transport axis.

Item 46 is the optical construction of item 45, wherein the refractive structures comprise one or more of prisms, linear prisms, piece-wise linear prisms, and lenticular structures.

Item 47 is the optical construction of item 36, further comprising a high absorption layer, wherein the light guide has an absorption A1 and the high absorption layer has an absorption A2, where A2 is greater than A1.

Item 48 is the optical construction of item 36, wherein the light guide comprises multiple light guides.

Item 49 is the optical construction of item 48, wherein the multiple light guides are tiled.

Item 50 is the optical construction of item 48, wherein the multiple light guides are arranged in an array.

Item 51 is the optical construction of item 48, further comprising multiple light sources respectively associated with the multiple light guides.

Item 52 is the optical construction of item 48, further comprising multiple light sources, wherein light outputs from the multiple light sources are individually controllable.

Item 53 is the optical construction of item 48, further comprising multiple light sources respectively associated with the multiple light guides, wherein a light source associated with a particular light guide is positioned under an adjacent light guide.

Item 54 is the optical construction of item 36, further comprising a down converting element.

Item 55 is the optical construction of item 36, wherein the light guide has input region comprising one or more of a flat input edge, a structured surface, and a channel.

Item 56 is the optical construction of item 36, further comprising light extraction features disposed on the first surface of the light guide.

Item 57 is the optical construction of item 36, wherein the low index layer is configured to reflect light exiting from the light guide at a first set of exit angles and the light re-directing film is configured to reflect light exiting from the light guide at a second set of exit angles.

Item 58 is the optical construction of item 36, further comprising one or more of a specular reflector, a semi-specular reflector, an enhanced specular reflector, an extended-band enhanced specular reflector, and a diffuse reflector.

Item 59 is the optical construction of item 36, wherein N1 is about 1.49.

Item 60 is the optical construction of item 36, wherein Nuli is in a range of about 1.10 to about 1.35.

Item 61 is the optical construction of item 36, wherein the low index layer has a haze that is not greater than 1%.

Item 62 is the optical construction of item 36, wherein the low index layer has a haze up to about 10%.

Item 63 is the optical construction of item 36, wherein the low index layer comprises gel or fumed silica.

Item 64 is the optical construction of item 36, wherein the thickness of the low index layer is not less than about 2 microns.

Item 65 is the optical construction of item 36, wherein the thickness of the low index layer is not less than about 1 micron.

Item 66 is the optical construction of item 36, wherein the low index layer comprises a plurality of voids.

Item 67 is the optical construction of item 66, wherein the voids are interconnected.

Item 68 is the optical construction of item 66, wherein a volume fraction of the plurality of voids is not less than about 20%.

Item 69 is the optical construction of item 66, wherein a volume fraction of the plurality of voids is not less than about 40%.

Item 70 is the optical construction of item 66, wherein a local volume fraction of the plurality of voids varies along a thickness direction of the low index layer.

Item 71 is the optical construction of item 66, wherein a first local volume fraction of the plurality of voids at a first surface of the low index layer is greater than a second local volume fraction of the plurality of voids at a second surface of the low index layer.

Item 72 is the optical construction of item 66, wherein the low index layer further comprises:
  a binder; and
  a plurality of particles wherein a weight ratio of the binder to the plurality of voids is not less than about 1:2.

Item 73 is the optical construction of item 36, wherein a polarizer is disposed between the light redirecting film and the low index layer.

Item 74 is the optical construction of item 73, wherein the polarizer comprises a multilayer optical film (MOF).

Item 75 is the optical construction of item 74, wherein the MOF comprises an extended band reflective polarizer.

Item 76 is the optical construction of item 36, wherein the light re-directing film comprises a first set of prisms having a first height and second set of prisms having a second height different from the first height.

Item 77 is the optical construction of item 36, wherein the light re-directing film comprises one or more linear or piece-wise linear prisms that have a variable height along a length of the one or more prisms.

Item 78 is the optical construction of item 36, wherein the light re-directing film has an index of refraction in a range of about 1.5 to about 1.8.

Item 79 is an optical construction, comprising:
  a light guide, having first and second major surfaces and an index of refraction N1;
  a low index layer having first and second major surfaces, the low index layer having an index of refraction, Nuli, where Nuli is less than N1, a substantial portion of the first major surface of the low index layer in physical contact with the second major surface of the light guide;
  a high absorption layer having a first major surface and a second major surface, a substantial portion of the first major surface of the high absorption layer in physical contact with the second major surface of the low index layer; and
  a prism film, having a first major surface and a second major surface, the first major surface comprising linear prisms and a substantial portion of the first major surface of the light re-directing film in physical contact with the second major surface of the high absorption layer, wherein the low index layer reflects light exiting from the light guide at a first set of exit angles and the light re-directing film is configured to reflect light exiting from the light guide at a second set of exit angles.

All patents, patent applications, and other publications cited above are incorporated by reference into this document as if reproduced in full. While specific embodiments and examples of the invention are described in detail above to facilitate explanation of various aspects of the invention, it should be understood that the intention is not to limit the invention to the specifics of the examples. Rather, the intention is to cover all modifications, embodiments, and alternatives falling within the scope of the invention as defined by the appended claims.

What is claimed is:

1. An optical construction, comprising:
  a light guide having first surface and a second surface comprising a major light exit surface of the light guide;
  a light redirecting film; and
  a low index layer disposed between the light guide and the light redirecting film, the low index layer having an index of refraction not greater than 1.35, the low index layer attached to the second surface of the light guide and to the light redirecting film;
  wherein in the light redirecting film comprises structured features.

2. The optical construction of claim 1, wherein the structured features include prisms.

3. The optical construction of claim 2, wherein the prisms include linear prisms.

4. The optical construction of claim 2, wherein the prisms are oriented parallel to a direction of light propagation in the light guide.

5. The optical construction of claim 1, wherein the light redirecting film has an absorption higher than an absorption of the light guide, and the light redirecting film includes scattering materials.

6. The optical construction of claim 1, wherein the structured features include lenticulars.

7. The optical construction of claim 1, wherein the structured features are continuous.

8. The optical construction of claim 1, wherein the structured features are piecewise continuous.

9. The optical construction of claim 1, wherein the structured features have in-plane serpentine variations.

10. The optical construction of claim 1, wherein the structured features include variations in a peak height along the same structured feature.

11. The optical construction of claim 1, wherein the structured features include variations in peak height between different structured features.

12. The optical construction of claim 1, further comprising a phosphor disposed near a light entry region or light exit region of the light guide.

13. The optical construction of claim 1, wherein the low index layer has a gradient of at least one of index of refraction and porosity.

14. The optical construction of claim 1, further comprising one or more light sources oriented near an input edge of the light guide.

15. The optical construction of claim 14, wherein the one or more light sources include one or more LEDs.

16. The optical construction of claim 15, wherein the one or more LEDs include LEDs that emit red, green, or blue light.

17. The optical construction of claim 15, further comprising one or more light sensors and a control system, wherein the one or more light sensors are configured to be used with the control system to independently control the light emitted from the one or more LEDs.

18. A sign, comprising the optical system of claim 1.

19. A luminaire, comprising the optical system of claim 1.

20. A display, comprising the optical system of claim 1.

21. An optical construction, comprising:
a light guide having first surface and a second surface comprising a major light exit surface of the light guide;
a reflective polarizer; and
a low index layer disposed between the light guide and the reflective polarizer, the low index layer having an index of refraction not greater than 1.35, the low index layer attached to the second surface of the light guide and to the reflective polarizer.

22. The optical construction of claim 21, wherein the reflective polarizer is a collimating reflective polarizer.

* * * * *

UNITED STATES PATENT AND TRADEMARK OFFICE
CERTIFICATE OF CORRECTION

PATENT NO.        : 9,229,149 B2
APPLICATION NO.   : 14/557231
DATED             : January 5, 2016
INVENTOR(S)       : John Wheatley It is certified that error appears in the above-identified patent and that said Letters Patent is hereby corrected as shown below:

Specification

Column 12
Line 27, Delete "1 OOH," and insert -- 100H, --, therefor.

Column 13
Line 62, Delete "00" and insert -- $\theta$0 --, therefor.

Column 14
Line 61, Delete "$\in$b" and insert -- nb --, therefor.

Column 29
Line 42, Delete "mm," and insert -- 10 mm, --, therefor.

Signed and Sealed this
Twenty-eighth Day of June, 2016

Michelle K. Lee
*Director of the United States Patent and Trademark Office*